(12) United States Patent
Espy-Wilson et al.

(10) Patent No.: US 7,664,642 B2
(45) Date of Patent: Feb. 16, 2010

(54) SYSTEM AND METHOD FOR AUTOMATIC SPEECH RECOGNITION FROM PHONETIC FEATURES AND ACOUSTIC LANDMARKS

(75) Inventors: Carol Espy-Wilson, Washington, DC (US); Amit Juneja, Roxbury, MA (US)

(73) Assignee: University of Maryland, College Park, MD (US)

( * ) Notice: Subject to any disclaimer, the term of this patent is extended or adjusted under 35 U.S.C. 154(b) by 922 days.

(21) Appl. No.: 11/081,507

(22) Filed: Mar. 17, 2005

(65) Prior Publication Data

US 2006/0212296 A1  Sep. 21, 2006

Related U.S. Application Data

(60) Provisional application No. 60/553,870, filed on Mar. 17, 2004.

(51) Int. Cl.
G10L 15/04 (2006.01)
(52) U.S. Cl. ..................................................... 704/254
(58) Field of Classification Search ................. 704/251, 704/254, 255
See application file for complete search history.

(56) References Cited

U.S. PATENT DOCUMENTS

| 4,813,076 | A | * | 3/1989 | Miller | 704/254 |
|---|---|---|---|---|---|
| 4,820,059 | A | * | 4/1989 | Miller et al. | 704/254 |
| 5,715,367 | A | * | 2/1998 | Gillick et al. | 704/254 |
| 5,749,069 | A | * | 5/1998 | Komori et al. | 704/240 |
| 5,805,771 | A | * | 9/1998 | Muthusamy et al. | 704/232 |
| 5,822,729 | A | * | 10/1998 | Glass | 704/255 |

(Continued)

OTHER PUBLICATIONS

Zue, V., et al., "Acoustic segmentation and phonetic classificaion in the SUMMIT system," Proc. IEEE International Conference on Acoustics, Speech, and Signal Processing (Glasgow), pp. 389-392, May 1989.

(Continued)

Primary Examiner—Michael N Opsasnick
(74) Attorney, Agent, or Firm—Rosenberg, Klein & Lee

(57) ABSTRACT

A probabilistic framework for acoustic-phonetic automatic speech recognition organizes a set of phonetic features into a hierarchy consisting of a broad manner feature sub-hierarchy and a fine phonetic feature sub-hierarchy. Each phonetic feature of said hierarchy corresponds to a set of acoustic correlates and each broad manner feature of said broad manner feature sub-hierarchy is further associated with a corresponding set of acoustic landmarks. A pattern recognizer is trained from a knowledge base of phonetic features and corresponding acoustic correlates. Acoustic correlates are extracted from a speech signal and are presented to the pattern recognizer. Acoustic landmarks are identified and located from broad manner classes classified by the pattern recognizer. Fine phonetic features are determined by the pattern recognizer at and around the acoustic landmarks. The determination of fine phonetic features may be constrained by a pronunciation model. The most probable feature bundles corresponding to words and sentences are those that maximize the joint a posteriori probability of the fine phonetic features and corresponding acoustic landmarks. When the hierarchy is organized as a binary tree, binary classifiers such as Support Vector Machines can be used in the pattern classifier and the outputs thereof can be converted probability measures which, in turn may be used in the computation of the aforementioned joint probability of fine phonetic features and corresponding landmarks.

20 Claims, 14 Drawing Sheets

U.S. PATENT DOCUMENTS

| | | | | |
|---|---|---|---|---|
| 5,848,388 | A | * | 12/1998 | Power et al. ................ 704/239 |
| 5,864,809 | A | * | 1/1999 | Suzuki ....................... 704/254 |
| 5,893,058 | A | * | 4/1999 | Kosaka ....................... 704/254 |
| 5,953,701 | A | * | 9/1999 | Neti et al. ................... 704/254 |
| 6,076,053 | A | * | 6/2000 | Juang et al. ................. 704/236 |
| 6,208,963 | B1 | * | 3/2001 | Martinez et al. ............ 704/232 |
| 7,457,745 | B2 | * | 11/2008 | Kadambe et al. ............ 704/216 |

OTHER PUBLICATIONS

Bitar, N., et al., "Knowledge-Based Parameters for HMM Speech Recognition", The 1996 IEEE Conference on Acoustics, Speech and Signal Processing, pp. 29-32, 1996.

Juneja, A., et al., "Segmentation of continuous speech using acoustic-phonetic parameters and statistical learning", Proceedings of International Conference on Neural Information Processing, vol. 2, p. 726-730, 2002.

Shah, J., et al., "Robust Voiced/Unvoiced Classification Using Novel Features and Gaussian Mixture Model", IEEE International Conference on Acoustics, Speech, & Signal Processing (ICASSP), Montreal, Canada, May 17-21, 2004, http://shahj.net/publications/icassp03_shah.pdf.

Juneja, A., et al., "Speech Segmentation Using Probabilistic Phonetic Feature Hierarchy and Support Vector Machines", Proceedings of International Joint Conference on Neural Networks, Portland, Oregan, 2003, http://www.enee.umd.edu/~juneja/paper_ijcnn.pdf or http//www.isr.umd.edu/Labs/SCL/publications/Amit_ijcnn_2003.pdf.

Glass, J., et al., "A probabilistic framework for feature-based speech recognition", International Conference on Spoken Language Processing, pp. 2277-2280, 1996.

Stevens, K., "Toward a model for lexical access based on acoustic landmarks and distinctive features", J. Acoust. Soc. Am., 111(4), 1872-1891, 2002.

Glass, J., et al., "Multi-level acoustic segmentation of continuous speech", International Conference on Acoustics, Speech and Signal Processing, New York, NY, pp. 429-432, 1988.

Drish, J., "Obtaining calibrated probability estimates from support vector machines", Final project for CSE 254: Seminar on Learning Algorithms, University of Califomia, San Diego, Jun. 2001, http://www-cse.ucsd.edu/users/jdrish/svm.pdf.

* cited by examiner

| /z/ | /l/ | /r/ | /o/ | /w/ | 510 |
|---|---|---|---|---|---|

| U ⇒ | u1 | u2 | u3 | u4 | u5 |
|---|---|---|---|---|---|
| | −SONORANT | −SONORANT | +SONORANT | +SONORANT | +SONORANT |
| | +CONTINUANT | +SYLLABIC | −SYLLABIC | +SYLLABIC | −SYLLABIC |
| | +STRIDENT | −BACK | −NASAL | +BACK | −NASAL |
| | +VOICED | +HIGH | +RHOTIC | −HIGH | +LABIAL |
| | +ANTERIOR | +LAX | | +LOW | |

520

| B ⇒ | Fr | V | SC | V | SC | 530 |
|---|---|---|---|---|---|---|

| L ⇒ | l1 | l2 | l3 | l4 | l5 |
|---|---|---|---|---|---|
| | Fon | VOP | Son | Vop | Son |
| | Foff | P | D | P | D |
| | | | Soff | | Soff |

SYSTEM AND METHOD FOR AUTOMATIC SPEECH RECOGNITION FROM PHONETIC FEATURES AND ACOUSTIC LANDMARKS

CROSS REFERENCE TO RELATED APPLICATIONS

This application claims benefit of U.S. Provisional Patent Application Ser. No. 60/553,870, entitled A PROBABILISTIC ACOUSTIC-PHOENETIC APPROACH TO AUTOMATIC SPEECH RECOGNITION, which was filed on Mar. 17, 2004 and is incorporated herein by reference in its entirety.

This invention was made with government support under Contract BCS0236707 awarded by NSF. The government has certain rights in this invention.

BACKGROUND OF THE INVENTION

1. Field of the Invention

The invention described herein is related to machine recognition of human speech. More specifically, the invention is directed to probabilistic methodologies and associated system architectures for automatic speech recognition based on acoustic correlates of phonetic features in signals representative of speech sounds by locating landmarks associated with broad manner phonetic features and extracting fine phonetic features at and around the landmark locations. In a further aspect of the invention, the acoustic correlates are knowledge-based acoustic parameters.

2. Description of the Prior Art

Numerous automatic speech recognition (ASR) procedures are known in the prior art, some of which, including embodiments of the present invention, utilize knowledge of acoustic-phonetics. These procedures can be classified into three broad categories: (1) the acoustic-phonetic approach to recognition, (2) the use of acoustic correlates of phonetic features in the front-ends of dynamic statistical ASR methods like Hidden Markov Models (HMMs), and (3) the use of phonetic features in place of phones as recognition units in the dynamic statistical approaches to ASR that use standard front-ends like Mel-Frequency Cepstral Coefficients (MFCCs).

In ASR systems of the prior art that use phonetic features as recognition units in statistical methods, the usual statistical frameworks are implemented and use phonetic features as an intermediate unit of recognition. The output of intermediate classifiers to then used to recognize phonemes, words, or sentences. These methods use no explicit knowledge of the acoustic correlates of phonetic features.

Some prior art ASR systems have utilized acoustic cues that are correlates of phonetic features to form the front-end in HMM based ASR methods. These methods traditionally use standard front-ends like MFCCs and Linear Predictive Coding (LPC) coefficients. The use of acoustic-phonetic knowledge in the front-ends of these systems has led to some improvement in performance as measured against certain performance criteria.

Research has shown that acoustic-phonetic knowledge based acoustic parameters perform better than the standard MFCC based signal representation on the task of broad class segmentation as tested using an HMM based back end. In particular, it has been shown that the decrease in performance was much less dramatic for the knowledge-based front-end than for MFCCs when cross-gender testing was carried out, that is, when training was done on males and testing was done on females, and vice versa. These experiments were extended to isolated word recognition and a similar pattern was observed not only for cross gender testing, but also for testing across adults and children whose speech can be from different databases.

The acoustic-phonetic approach is characterized by the use of spectral coefficients or knowledge-based acoustic correlates of phonetic features to first carry out a segmentation of speech and then analyze the individual segments or linguistically relevant landmarks for phonemes or phonetic features. This method may or may not involve the use of statistical pattern recognition methods to carry out the recognition task. That is, these methods include pure knowledge based approaches with no statistical modeling. The acoustic phonetic approach has been followed and implemented for recognition in varying degrees of completeness or capacity of application to real world recognition problems. FIG. 1 illustrates via a block diagram a system configuration which implements the traditional acoustic phonetic approach. First, speech is analyzed by signal processor 110 using any one of a number of spectral analysis techniques, e.g., Short-Time Fourier Transform (STFT), Linear Predictive Coding (LPC) or Perceptual Linear Prediction (PLP). Typically, speech is processed using overlapping frames of 10-25 ms and overlap of 5 ms. Acoustic correlates of phonetic features are extracted from the spectral representation of the speech signal. For example, low frequency energy may be calculated as and acoustic correlate of sonorancy and zero crossing rate may be calculated as a correlate of frication. The acoustic correlates are then passed to landmark detection or speech segmentation module 120. Speech is then segmented by either finding transient locations using spectral change across adjacent frames, or by using the acoustic correlates of source or-manner classes to determine segments possessing stable manner classes. Further analysis of the individual segmentations is carried out in feature detection or phone classification module 130 by recognizing each segment as a phoneme directly or by determining the presence or absence of individual phonetic features and using the intermediate determinations to find the phonemes. When multiple segmentations are generated, as opposed to just a single segmentation, a number of different phoneme sequences may result. The phoneme sequences may be subsequently constrained by a sentence recognition module 140 to select a best representation of the speech based on acoustic and language scores corresponding to the vocabulary and grammar of the language spoken.

Most applications of acoustic phonetic methods in the prior art have been limited to the landmark detection module 120 and the phone classification module 130. Only the SUMMIT system discussed below has implemented an acoustic-phonetic system to carry out recognition on continuous speech with a substantial vocabulary. However, the SUMMIT system uses a traditional front end with little or no knowledge-based acoustic parameters (APs).

A number of problems have been associated with acoustic-phonetic systems of the prior art. First, it has been argued that the difficulty in proper decoding of phonetic units into words and sentences grows dramatically with an increase in the rate of phoneme insertion, deletion, and substitution. This argument makes the assumption that phoneme units are recognized in a first path with no knowledge of language and vocabulary constraints. This has been true for many of the acoustic-phonetic methods, but need not be limiting since vocabulary and grammar constraints may be used to constrain the speech segmentation paths.

Another shortcoming of the prior art is that extensive knowledge of the acoustic manifestations of phonetic units are required in those systems and the lack of completeness of this knowledge has been pointed out as a drawback of the knowledge-based approach. While it is true that the knowledge is incomplete, there is no reason to believe that the standard signal representation, for example, Mel-Frequency Cepstral Coefficients (MFCCs) used in previous ASR systems, are sufficient to capture all of the acoustic manifestations of the speech sound. Moreover, although a comprehensive knowledge base has not been implemented, there has been significant development in the research on acoustic correlates, such as for place of stop consonants and fricatives, nasal detection, and semivowel classification. Thus, a scalable system, such as that of the present invention, must be implemented to allow the addition of new knowledge as it is developed.

A third argument against the acoustic-phonetic approach is that the choice of phonetic features and their acoustic correlates is not optimal. It is true that linguists may not agree with each other on the optimal set of phonetic features, but standardization of an optimal set of features may commence without abandoning the acoustic-phonetic approach as a viable ASR option. For example, the exemplary phonetic feature set used in embodiments of the present invention is based on known distinctive feature theories and are at a minimum optimal in that sense. The scalability of the present invention allows reorganization of acoustic correlates at any time as feature sets converge to approach optimal.

A further drawback of the acoustic-phonetic approach, as argued by detractors thereof, is that the design of sound classifiers is not optimal. This argument probably assumes that binary decisions with hard knowledge-based thresholds are used to carry out the classification. However, statistical pattern recognition methods that are no less optimal than the HMMs have been applied to specific procedures of acoustic-phonetic methods, including some acoustic phonetic knowledge-based methods, with some success. However, application of statistical pattern recognition methods to even recognition tasks at the word level in acoustic phonetic based systems to accomplish complete recognition tasks, such as those accomplished through the present invention, has not heretofore been realized.

Another shortcoming of the acoustic-phonetic approach that has been argued is that no well-defined automatic procedure exists for tuning the method. Acoustic-phonetic methods can be tuned if they use standard data driven pattern recognition procedures, which is a requirement that also applies to the present invention. However, the present invention implements an ASR system that does not require tuning except under extreme circumstances, for example, accents that are extremely different from standard American English (assuming the original system was trained on natively-born American speakers).

The aforementioned SUMMIT system is a prior art ASR system that implements a traditional statistical model front-end using, for example, MFCCs or auditory-based models to obtain multi-level segmentations of the speech signal. The segments are found using either (1) an acoustic segmentation method which finds time instances when the change in the spectrum is beyond a certain threshold, or (2) boundary detection methods that use statistical context dependent broad class models. The segments and landmarks (defined by boundary locations) are then analyzed for phonemes using Gaussian Mixture Models (GMMs) or multi-layer perceptrons with exceptional results.

The combination of landmark and knowledge-based approaches to automatic speech recognition offers a number of advantages over systems of the prior art. First, by carrying out the analysis only at significant locations, the landmark-based approach to speech recognition utilizes strong correlation among the speech frames. Second, analysis at different landmarks may be done with different acoustic correlates that are computed at different resolutions. For example, analysis at stop bursts to determine the place of articulation requires a higher resolution than that required at syllabic peaks to determine the tongue tip and blade features. Third, the approach provides very straightforward analysis of errors. Given the physical significance of the acoustic correlates and a recognition framework that uses only the relevant acoustic correlates, error analysis can determine whether the acoustic correlates need to be refined or when the decision process did not take into account a certain type of variability that occurs in the speech signal. In fact, this combined landmark and knowledge-based approach to recognition is a tool in itself for understanding speech variability.

While there have been many attempts at an acoustic-phonetic approach to ASR, only the SUMMIT system has been able to match the performance of HMM based methods on practical recognition tasks. The other acoustic-phonetic methods were stopped at the level of finding distinctive acoustic correlates of phonetic features, detection of landmarks, or broad class recognition. Although the SUMMIT system carries out segment based speech recognition with some knowledge-based measurements, it is neither a landmark based system per se nor a phonetic feature based system. Like HMM based systems, it uses all available acoustic information (for example, all the MFCCs) for all decisions. While acoustic-phonetics knowledge and the concept of phonetic features have been used with HMM based systems with some success, the addition has only marginally enhanced the ability to recognize speech at the level of phonemes.

Certain embodiments of the present invention are similar to SUMMIT in that both systems generate multiple segmentations, as will be discussed below, and then use the information extracted from the segments or landmarks to carry out further analysis in a probabilistic manner. However, there are many significant factors that set the systems apart. First, SUMMIT is a phone-based recognition system while the present invention is a phonetic feature based system. Secondly, although the present invention uses a similar concept of obtaining multiple segmentations and then carrying out further analysis based on the information obtained from those segments, the present invention concentrates on linguistically motivated landmarks as opposed to analyzing all the front-end parameters extracted from segments and segment boundaries, as is a principle of SUMMIT. Furthermore, certain embodiments of the present invention do not require every observable acoustic correlate to be included in the phonetic analysis of the segments in that the sufficiency and invariance properties of predetermined acoustic parameters are utilized. Moreover, certain embodiments of the present invention implement binary phonetic feature classification, which provides a uniform framework for speech segmentation, phonetic classification, and lexical access. This differs greatly from the SUMMIT system where segmentation and analysis of segments are carried out using different procedures. Finally, as previously noted, the SUMMIT system uses standard model front-ends for recognition with a few augmented knowledge-based measurements, while certain embodiments of the present invention utilize only the relevant knowledge-based APs for each decision.

SUMMARY OF THE INVENTION

The present invention overcomes the shortcomings of the prior art by implementing methods and associated systems having a knowledge base of phonetic features, each of which is associated with a corresponding set of acoustic correlates. The phonetic features are organized into a hierarchy including a broad manner sub-hierarchy of broad manner phonetic features and a fine phonetic feature sub-hierarchy of fine phonetic features. Each of the broad manner phonetic features corresponds to a set of acoustic landmarks. A pattern recognizer is provided to determine a phonetic feature of the hierarchy from a set of acoustic correlates provided thereto and to determine a probability measure of likelihood that the provided set of acoustic correlates is associated with the phonetic feature. The pattern recognizer is trained on phonetic features and corresponding acoustic correlates contained in the knowledge base. A speech signal including a sequence of speech frames is obtained and acoustic correlates are extracted from each frame. The acoustic correlates are classified into a set of broad manner classes, each of which corresponds to a broad manner phonetic feature, via the pattern recognizer and locations of acoustic landmarks are determined therefrom. A plurality of possible landmark sequences are formed from the acoustic landmarks and a first probability measure of likelihood is computed for each possible landmark sequence. Acoustic correlates of a predetermined number of speech frames proximate to each of said acoustic landmarks are presented to the pattern recognizer to determine a corresponding fine phonetic feature for each of the set of broad manner classes. A plurality of possible fine phonetic feature sequences are formed from the fine phonetic features corresponding to each set of broad manner classes and a second probability measure is computed for each possible fine phonetic feature sequences. A landmark sequence from the possible landmark sequences is combined with a fine phonetic feature sequence from the possible fine phonetic feature sequences if a product of the first probability measure and the second probability measure is among a predetermined number of maximum values of that product for all of the possible landmark sequences and all of the possible fine phonetic feature sequences.

BRIEF DESCRIPTION OF THE DRAWINGS

FIG. 5 is a chart illustrating the phonetic features, broad manner classes and landmarks of the utterance "zero" in accordance with embodiments of the present invention;

DETAILED DESCRIPTION OF PREFERRED EMBODIMENTS

The present invention implements acoustic-phonetic methods for automatic speech recognition (ASR) in what will be referred to herein as the Event-Based System (EBS). The invention is based on the concept that speech sounds may be represented by bundles of phonetic features and acoustic landmarks. EBS uses knowledge-based acoustic parameters (APs) by which acoustic correlates corresponding to the manner features sonorant, syllabic and continuant are observed, to obtain multiple probabilistic landmark sequences for a speech signal. The landmarks are then used to extract fine feature acoustic correlates for other manner features such as nasal and strident, and for place and voicing features. A posteriori probabilities of words may then be determined from the probabilities of feature bundles, and the most probable feature bundle or bundles may be provided for further analysis by, for example, a lexical access process.

Phonetic features are more fundamental units of speech than are the phones, phonemes or triphones typically used in conventional automatic speech recognition. Unlike phonemes, phonetic features have clear articulatory and acoustic correlates, and many of the acoustic correlates can be automatically extracted from the speech signal. Also, phonetic features can describe all languages in the world while phonemes differ highly from language to language. Moreover, research has provided evidence of the use of phonetic features in human perception of speech. Further research has shown that splitting the speech recognition problem into the recognition of manner, place and voicing features, such as is implemented by the present invention, can be advantageous in noisy environments.

Figure 1:
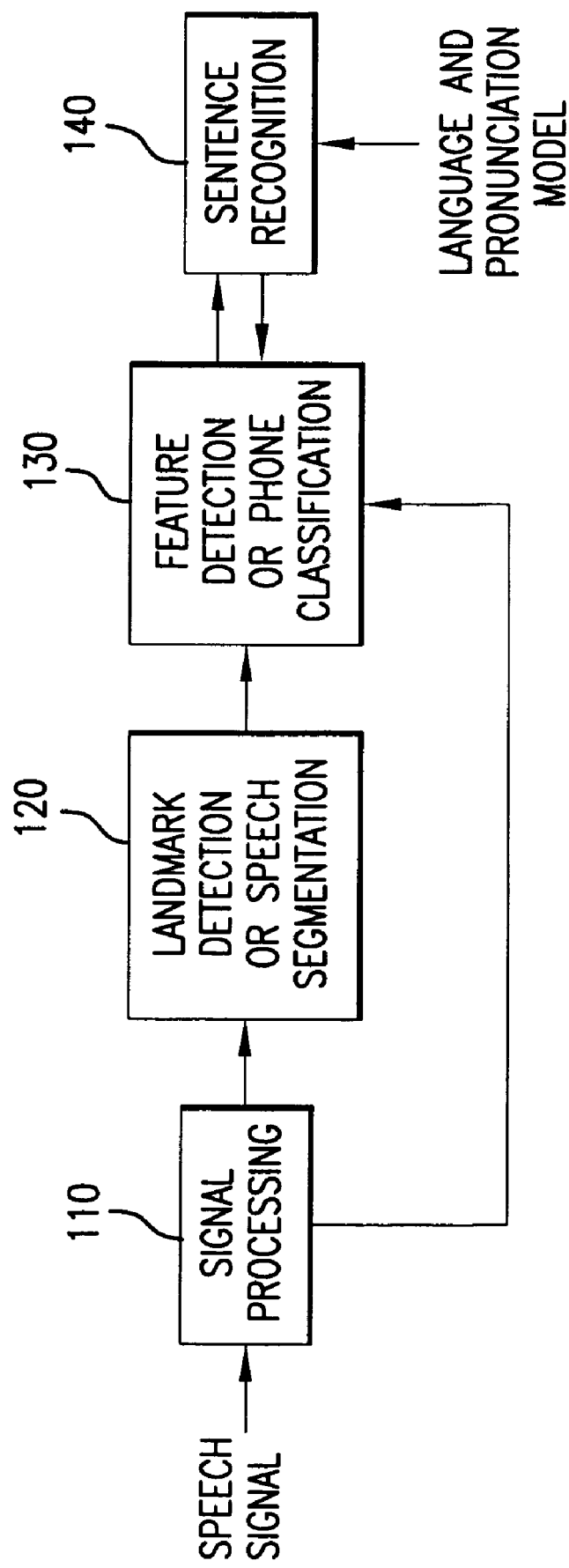
FIG. 1 is a block diagram of an acoustic-phonetic automatic speech recognition system of the prior art.
Figure 2:
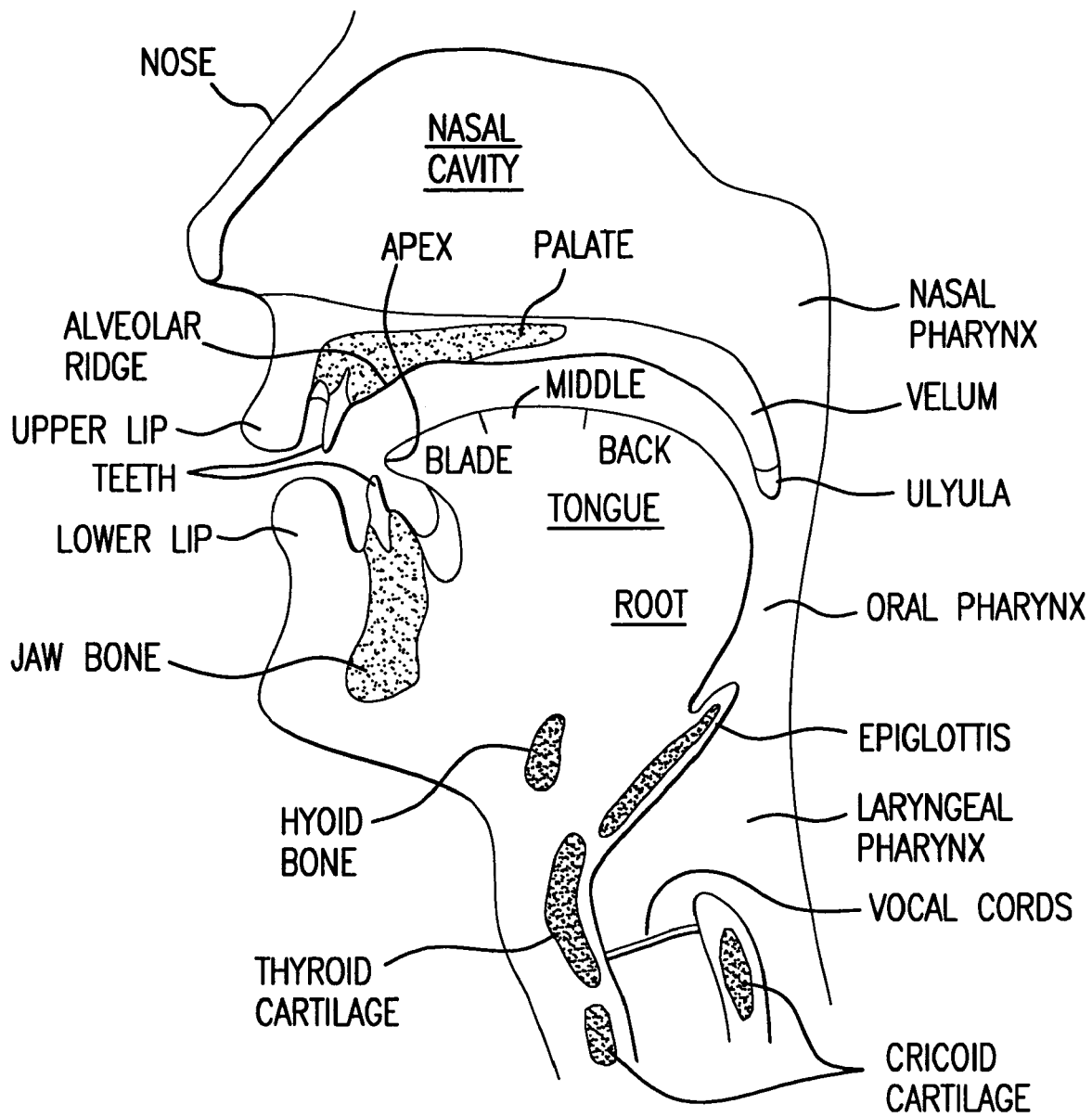
FIG. 2 is an illustration of the primary features of the human vocal tract.

Speech is produced when air from the lungs is modulated by the larynx and the supra-laryngeal structures of the human vocal tract. FIG. 2 reveals the various articulators that act as modulators for the production of speech. The characteristics of the excitation signal and the shape of the vocal tract filter determine the quality of the speech pattern one hears.

In the analysis of a sound segment, there are three general descriptors that are used—source characteristics, manner of articulation and place of articulation. Corresponding to the three types of descriptors, three types of articulatory phonetic features can be defined—manner of articulation phonetic features, source features, and place of articulation features. The phonetic features may be represented by minimal binary valued units that are sufficient to describe all the speech sounds of any language. For purposes of the following discussions, the phonetic features are assumed to be American English phonemes, which are given in Tables 1-3 with examples of words in which the phonemes occur.

The source or excitation of speech is periodic when air is forced from the lungs at sufficient pressure to cause the vocal folds to vibrate, or is aperiodic when either the vocal folds are spread apart or the source is produced at a constriction in the vocal tract. The sounds that have the periodic source or vocal fold vibration present are said to possess the value '+' for the voiced feature and the sounds with no periodic excitation have the value '−' for the feature voiced. Both periodic and aperiodic sources may be present in a particular speech sound. For example, the sounds /v/ and /z/ are produced with vocal fold vibration, but a constriction in the vocal tract adds an aperiodic turbulent noise source. The dominant excitation is usually the turbulent noise source generated at the constriction. The sounds generated by both sources are still +voiced by definition, because of the presence of the periodic source.

Manner of articulation refers to how open or closed is the vocal tract, how strong or weak is the constriction and whether the air flow is through the mouth or the nasal cavity. Manner phonetic features are also referred to as articulator-free features, in that while these features are independent of the main articulator, they are related to the manner in which the articulators are used. The sounds in which there is no sufficiently strong constriction so as to produce turbulent noise or stoppage of air flow are called sonorants and include vowels and the sonorant consonants (nasals and semi-vowels). Sonorants are characterized by the phonetic feature +sonorant and the non-sonorant sounds (stop consonants and fricatives) are characterized by the feature −sonorant. Sonorants and non-sonorants can be further classified as shown in Table 4, which summarizes the broad manner classes (vowels, sonorant consonants, stops and fricatives), the broad manner phonetic features—sonorant, syllabic and continuant and the articulatory correlates of the broad manner phonetic features.

TABLE 1

The features strident, voiced, and the place features for fricative consonants

| Feature | Articulatory correlate | v | f | dh | th | z | zh | s | sh |
| --- | --- | --- | --- | --- | --- | --- | --- | --- | --- |
| voiced | Vocal fold vibration | + | − | + | − | + | + | − | − |
| strident | Air stream from the constriction hits an obstacle | − | − | − | − | + | + | + | + |
| alveolar | Tongue tip against alveolar ridge | − | − | + | + | + | − | + | − |
| labial | Constriction at lips | + | + | − | − | − | − | − | − |

TABLE 2

The place and manner features for sonorant consonants

| Feature | Articulatory correlate | w | r | l | y | n | m | ng |
| --- | --- | --- | --- | --- | --- | --- | --- | --- |
| nasal | Closed oral cavity, Flow through nasal Cavity | − | − | − | − | + | + | + |
| labial | Constriction at lips | | | | | − | + | − |
| alveolar | Tongue tip against alveolar ridge | | | | | + | − | − |
| rhotic | Curled up tongue | − | + | − | − | | | |
| lateral | Lateral airflow around one or both sides of tongue | − | − | + | − | | | |
| round | Lip rounding | + | − | − | − | | | |

TABLE 3

The place features for vowels

| Feature | Articulatory correlate | iy | ih | ey | eh | ae | aa | ao | ow | ah | uw | uh |
| --- | --- | --- | --- | --- | --- | --- | --- | --- | --- | --- | --- | --- |
| back | Tongue positioned towards back of mouth | − | − | − | − | − | + | + | + | + | + | + |
| low | Low tongue position | − | − | − | − | + | + | + | − | − | + | + |
| high | High tongue position | + | + | − | − | − | − | − | − | − | − | − |
| tense | Tense articulators | + | − | + | − | − | | + | − | + | − | |
| round | Lip rounding | − | − | − | − | − | − | + | + | − | + | + |

TABLE 4

Broad manner of articulation classes and the manner phonetic features

| Phonetic feature | Articulatory correlate | Vowels | Sonorant Consonants (nasals and semi-vowels) | Fricatives | Stops |
| --- | --- | --- | --- | --- | --- |
| sonorant | No constriction or constriction not narrow enough to produce turbulent noise | + | + | − | − |
| syllabic | Open vocal tract | + | − | | |
| continuant | Incomplete constriction | | | + | − |

Table 5 illustrates finer classification of phonemes on the basis of the manner phonetic features and the voicing feature. As is shown in the Table, fricatives can further be classified by the manner feature strident. The +strident feature signifies greater degree of frication or greater turbulent noise, that occurs in the sounds /s/, /sh/, /z/, /zh/. The other fricatives /v/, /f/, /th/ and /dh/ are classified as −strident. Sonorant consonants can be further classified by using the phonetic feature +nasal or −nasal. Nasals, with +nasal feature, such as /m/, /n/, and /ng/, are produced with a complete stop of air flow through the mouth. Instead, the air flows out through the nasal cavities.

TABLE 5

Classification of phonemes on the basis on manner and voicing phonetic features

| Phonetic feature | s, sh | z, zh | v, dh | th, f | p, t, k | b, d, g | vowels | w r l y | n ng m |
|---|---|---|---|---|---|---|---|---|---|
| voiced | − | + | + | − | − | + | + | + | + |
| sonorant | − | − | − | − | − | − | + | + | + |
| syllabic |  |  |  |  |  |  | + | − | − |
| continuant | + | + | + | + | − | − |  |  |  |
| strident | + | + | − | − | − | − |  |  |  |
| nasal |  |  |  |  |  |  |  | − | + |

The third classification required to produce or characterize a speech sound is the place of articulation, which refers to the location of the most significant constriction (for stops, fricatives and sonorant consonants) or the shape and position of the tongue (for vowels). For example, using place phonetic features, stop consonants may be classified (see Table 6) as (1) alveolar (/d/ and /t/) when the constriction is formed by the tongue tip and the alveolar ridge (2) labial (/b/ and /p/) when the constriction is formed by the lips, and (3) velar (/k/ and /g/) when the constriction is formed by the tongue dorsum and the palate. The stops with identical place, for example the alveolars /d/ and /t/ are distinguished by the voicing feature, that is, /d/ is +voiced and /t/ is −voiced.

TABLE 6

Classification of stop consonants on the basis of place phonetic features

| Phonetic feature | Articulatory correlate | b p | d t | g k |
|---|---|---|---|---|
| velar | Constriction between tongue body and soft palate | − | − | + |
| alveolar | Constriction between tongue tip and alveolar ridge | − | + | − |
| labial | Constriction between the lips | + | − | − |

All speech sounds can, therefore, be represented by a collection or bundle of phonetic features. For example, the phoneme /z/ can be represented as a collection of the features {−sonorant, +continuant, +voiced, +strident, +anterior}. Moreover, words may be represented by a sequence of bundles of phonetic features. Table 7 shows the representation of the digit 'zero', pronounced as /z I r ow/, in terms of its associated phonetic features.

TABLE 7

Phonetic feature representation of the word "zero"

| /z/ | /I/ | /r/ | /o/ | /w/ |
|---|---|---|---|---|
| −sonorant | +sonorant | +sonorant | +sonorant | +sonorant |
| +continuant | +syllabic | −syllabic | +syllabic | −syllabic |
| +voiced | −back | −nasal | +back | −nasal |
| +strident | +high | +rhotic | −high | +labial |
| +anteriot | +lax |  | +low |  |

Figure 3:
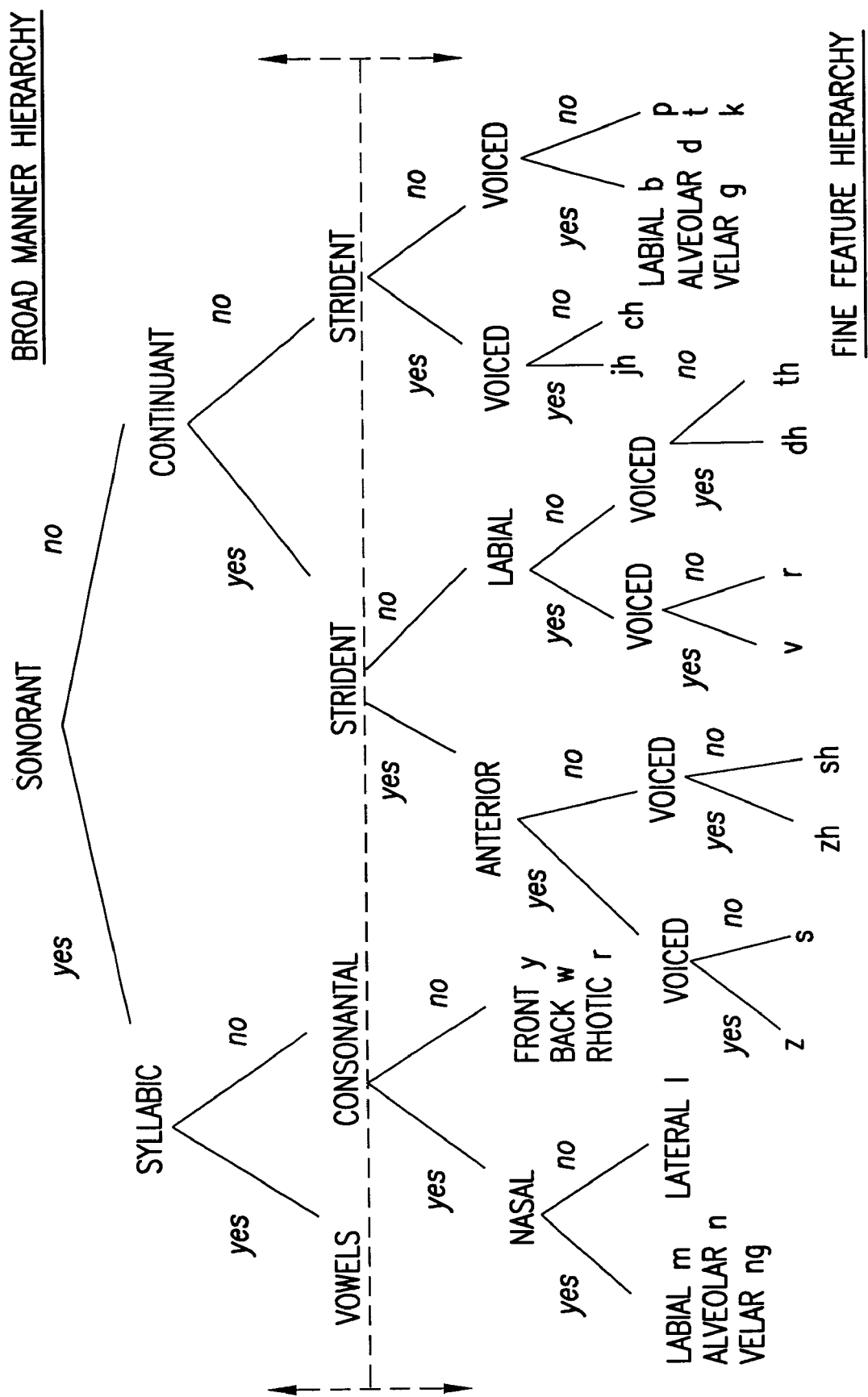
FIG. 3 is a diagram illustrating a hierarchy of phonetic features in accordance with embodiments of the present invention.

In certain embodiments of the present invention, phonetic features are arranged in a hierarchy such as the exemplary hierarchy depicted in FIG. 3. For maximum efficiency in the implementation of EBS, the hierarchy should limit the description of phonemes to a minimal set of phonetic features. Note, for example, that the feature strident is not relevant for sonorant sounds and is thus removed from the branch of the hierarchy that contains sonorant features. Similar limitations are made for other phonetic features of speech such that, by prudent arrangement of carefully selected phonetic features, a hierarchy of features may be assembled to afford scalability in the overall system. It is to be noted that the exemplary hierarchy of FIG. 3 is divided into a broad manner sub-hierarchy of broad manner phonetic features over a fine phonetic feature sub-hierarchy of fine phonetic features. This allows separation of the broad manner feature recognition task from that of fine phonetic feature recognition. Thus, fine feature detectors may be added to the inventive system as they are developed without affecting the operation of the broad manner recognition process. Further scalability is advanced to the inventive system when the hierarchy of features is arranged into a binary tree, such as is depicted in FIG. 3. This allows the use of binary classifiers to be implemented at decision nodes of the hierarchy. The addition and training of binary classifiers is generally straight forward and well documented. Also, certain binary classifiers, such as the Support Vector Machines discussed below, require less training data than do their dynamic statistical model counterparts.

Phonetic features, such as the binary phonetic features shown in FIG. 3 manifest in the acoustic signal in varying degrees of strength. For purposes of describing the invention, the term Acoustic Parameters, or APs, will refer to acoustic features of speech that can be extracted directly from the speech signal and from which the acoustic correlates of phonetic features can be determined. In EBS, the APs related to the broad manner phonetic features sonorant, syllabic and continuant, examples of which are shown in Table 8, are extracted from every frame of speech. In the Table below, and elsewhere in this disclosure, the notation E[x, y] refers to the energy in the frequency band starting at x Hertz and ending at y Hertz, $f_s$ is the sampling frequency of the speech signal, and F1, F2 and F3 are the first, second and third formant frequencies of speech, respectively.

TABLE 8

APs used in broad class segmentation.

| Phonetic Feature | APs |
|---|---|
| Silence | (1) E[0, F3 − 1000], (2) E[F3, $f_s$/2], (3) ratio of spectral peak in [0, 400 Hz] to the spectral peak in [400, $f_s$/2], (4) Energy onset (5) Energy offset |
| sonorant | (1) Temporal measure of periodicity, (2) Temporal measure of aperiodicity (3) Ratio of E[0, F3 − 1000] to E[F3 − 1000, $f_s$/2−], (4) E[100, 400] |
| syllabic | (1) E[640, 2800] (2) E[2000, 3000] (3) Temporal measure of periodicity (4) Temporal measure of aperiodicity (5) Total energy |
| continuant | (1) Temporal onset measure, (2) Temporal offset measure, (3) E[0, F3 − 1000], (4) E(F3 − 1000, $f_s$/2] |

Figure 4:
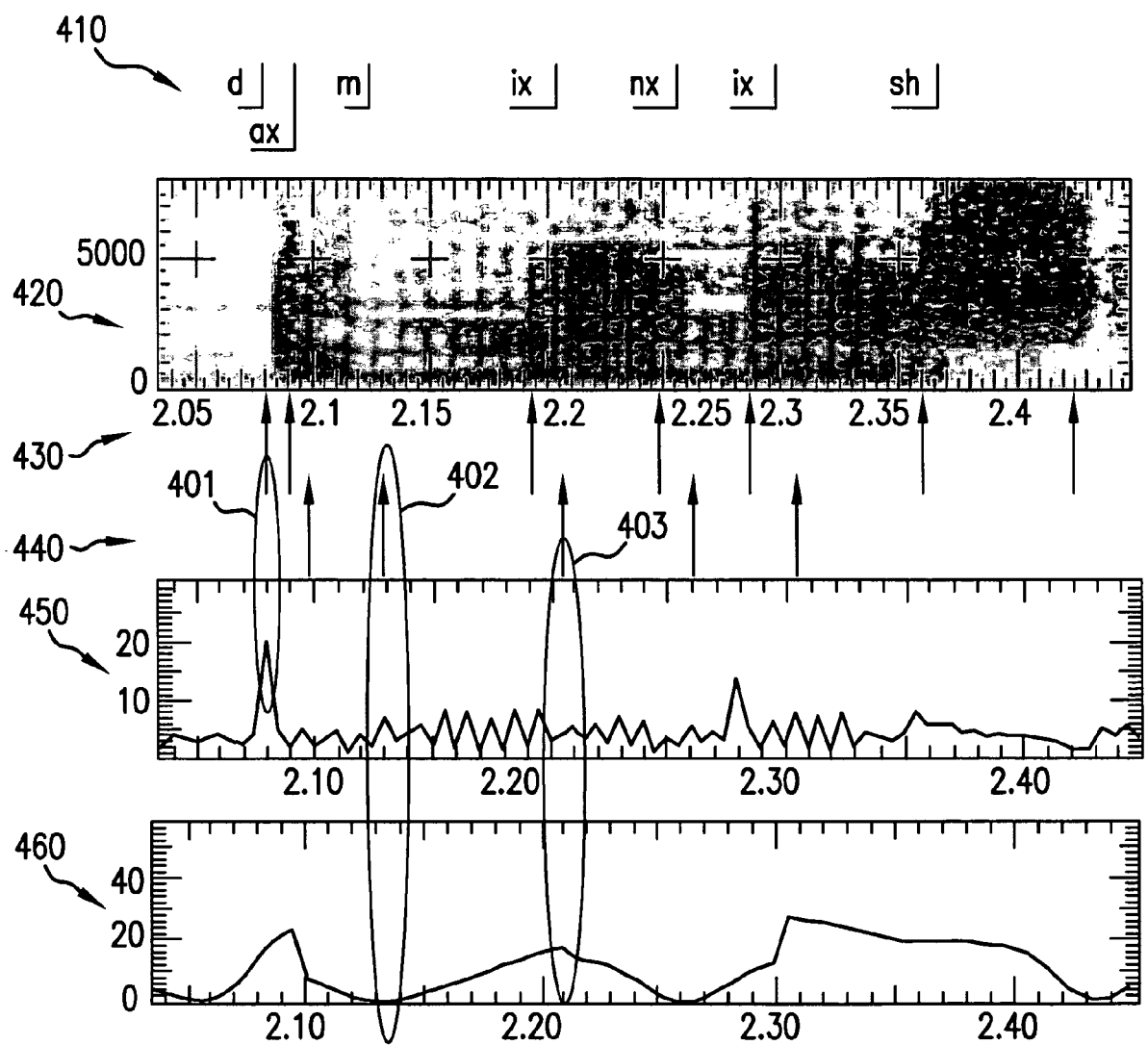
FIG. 4 is a chart illustrating the use of acoustic correlates on identifying features of speech in accordance with embodiments of the present invention.

The APs for broad manner features and the determination of the presence or absence of each feature are used to find a set of landmarks in the speech signal, as will be discussed further below. FIG. 4 illustrates exemplary landmarks of the word "diminish" as obtained from the acoustic correlates of the manner phonetic features. Whereas the scalability of the present invention allows the incorporation of new landmarks as they are identified, exemplary embodiments thereof will direct itself to two types of manner landmarks: (1) landmarks defined by a temporally abrupt change in the speech frequency spectrum, for example, burst landmark for stop consonants (shown by ellipse 401 in FIG. 4) and vowel onset point (VOP) for vowels, and (2) landmarks defined by locally prominent features of a smoothly varying acoustic parameter, such as maxima or minima in an energy band, for example, a point of maximum low frequency energy in a vowel (shown at ellipse 403 of FIG. 4, for example) and a point of lowest energy in a certain frequency band for an intervocalic sonorant consonant (a sonorant consonant that lies between two vowels).

In FIG. 4, the phoneme labels for the word "diminish" are shown at 410 and the spectrogram is shown at 420. Landmarks characterized by a sudden change in the signal properties are illustrated at 430 and the landmarks characterized by maxima or minima of a correlate of a manner phonetic feature are illustrated at 440. An exemplary onset waveform corresponding to the acoustic correlate of the phonetic feature continuant is shown at 450. An acoustic correlate of the phonetic feature syllabic, as determined from E[640, 2800], is illustrated at 460. Ellipse 401 indicates the location of a stop burst landmark for the consonant /d/ using the maximum value of the onset energy, which is indicative of a sudden change in speech. Ellipse 402 indicates a syllabic dip for the nasal /m/ by locating a minimum value of E[640, 2800]. Ellipse 403 is located at a maximum value for E[640, 2800], which corresponds to the syllabic peak landmark of the vowel /ix/.

As will be discussed further below, the acoustic correlates of place and voicing phonetic features are extracted at and around the locations of the manner landmarks. For example, the stop consonants /p/, /t/, and /k/ are all unvoiced stop consonants and they differ in their place phonetic features, /p/ is +labial, /t/ is +alveolar and /k/ is +velar. The acoustic correlates of these three place phonetic feature types can be extracted using the burst landmark and the VOP. The acoustic cues for place and voicing phonetic features are most prominent at the locations provided by the manner landmarks, and they are least affected by contextual or coarticulatory effects at those locations. For example, the formant structure typical to a vowel is expected to be most prominent at the location in time where the vowel is being spoken with the maximum loudness. It should be noted from the foregoing discussion, that not only do the manner landmarks provide the locations at which fine phonetic features are to be found, but the identities of the manner landmarks of the present invention also indicate which fine phonetic features are to be sought for at a landmark location.

The problem of recognition of bundles of features can be expressed as maximizing the a posteriori probability that a sequence of landmarks and corresponding feature bundles are representative of the speech, given the observation sequence O, which is the signal representation of the speech. That is, $$\hat{U}\hat{L} = \mathrm{argmax}_{UL} P(UL|O) = \mathrm{argmax}_{UL} P(L|O)P(U|OL), \quad (1)$$

where $L=\{l_i\}_{i=1}^M$ is a sequence of landmarks and $U=\{u_i\}_{i=1}^N$ is the sequence of phonemes or bundles of features corresponding to the phoneme sequence. It should be noted that the sequence O is a superset of (1) acoustic correlates required to determine the phonetic features and (2) redundant or superfluous acoustic representations of the speech. The correspondence of the symbols of Equation (1) is illustrated in FIG. 5 for an utterance of the digit "zero". In the Figure, the phonemes are depicted at 510, the corresponding phonetic features are shown at 520, the corresponding broad manner classes are depicted at 530 and the corresponding landmark sequences are shown at 540.

There are several points to note with regard to the example of FIG. 5. First, $l_i$ denotes a set of related landmarks that occur together. For example, the syllabic peak (syllable nucleus) and the vowel onset point (VOP) occur together. Also certain landmarks may be repeated in the sequence. For example, when a vowel follows a sonorant consonant, the sonorant consonant offset and the vowel onset are identical.

Each set of landmarks $l_i$ of FIG. 5 is related to a broad class $B_i$ of speech selected from a closed set, for example the set {vowel (V), fricative (Fr), sonorant consonant (SC), stop burst (ST), silence (SIL)} as shown in Table 1. For example, the syllabic peak and the VOP are related to the broad class V. Let $B=\{B_j\}_{j=1}^M$ denote the sequence of broad classes corresponding to the sequence of sets of landmarks L. Note that, while not shown in FIG. 5, the broad class ST denotes the burst region of a stop consonant, and the closure region is assigned the broad class SIL.

It is to be noted that the number of the set of landmarks M and the number of bundles of phonetic features N may not be the same in general. A difference may occur when a sequence of sets of landmarks and the corresponding broad class sequence, for example, SIL-ST, correspond to single set of phonetic features (the closure and the release constitute one stop consonant) or two bundles (closure corresponds to one stop consonant and release corresponds to another stop consonant, e.g., the cluster /kt/ in the word "vector"). Also, one set of landmarks or the corresponding broad class may correspond to two sets of place features, for example, in the word "omni" with the broad class sequence V-SC-V, the SC will have the features of the sound /m/ (calculated using the SC onset) as well as the sound /n/ (calculated using SC offset).

When carefully selected, such as is implemented by embodiments of the present invention, a set of landmarks and a sequence of broad classes, for a sequence of words, can be obtained deterministically from each other. For example, the sequence B={SIL, Fr, V, SC, V, SC, SIL} for "zero" in FIG. 5 will correspond to the sequence of sets of landmarks L shown. When so established, $$P(L|O)=P(B_L|O), \quad (2)$$

where $B_L$ is a sequence of broad classes for which the landmark sequence L is obtained. This equivalence of broad classes and landmarks is not general statement, but holds true for the landmarks and broad classes shown in Table 9. The present invention advantageously makes use of this property in the classification of features, as will be clear in paragraphs that follow. It is to be noted that there is no temporal information contained in B, U, and L other than the order in which the symbols occur.

TABLE 9

Landmarks and Corresponding Broad Classes.

| Broad Class Segment | Landmark Type |
|---|---|
| Vowel | Syllabic peak (P) |
|  | Vowel Onset point (P) |
| Stop | Burst |
| SC | Syllabic dip (D) |
|  | SC onset (Son) |
|  | SC offset (Soff) |
| Fricative | Fricative onset (Fon) |
|  | Fricative offset (Foff) |

Figure 6:
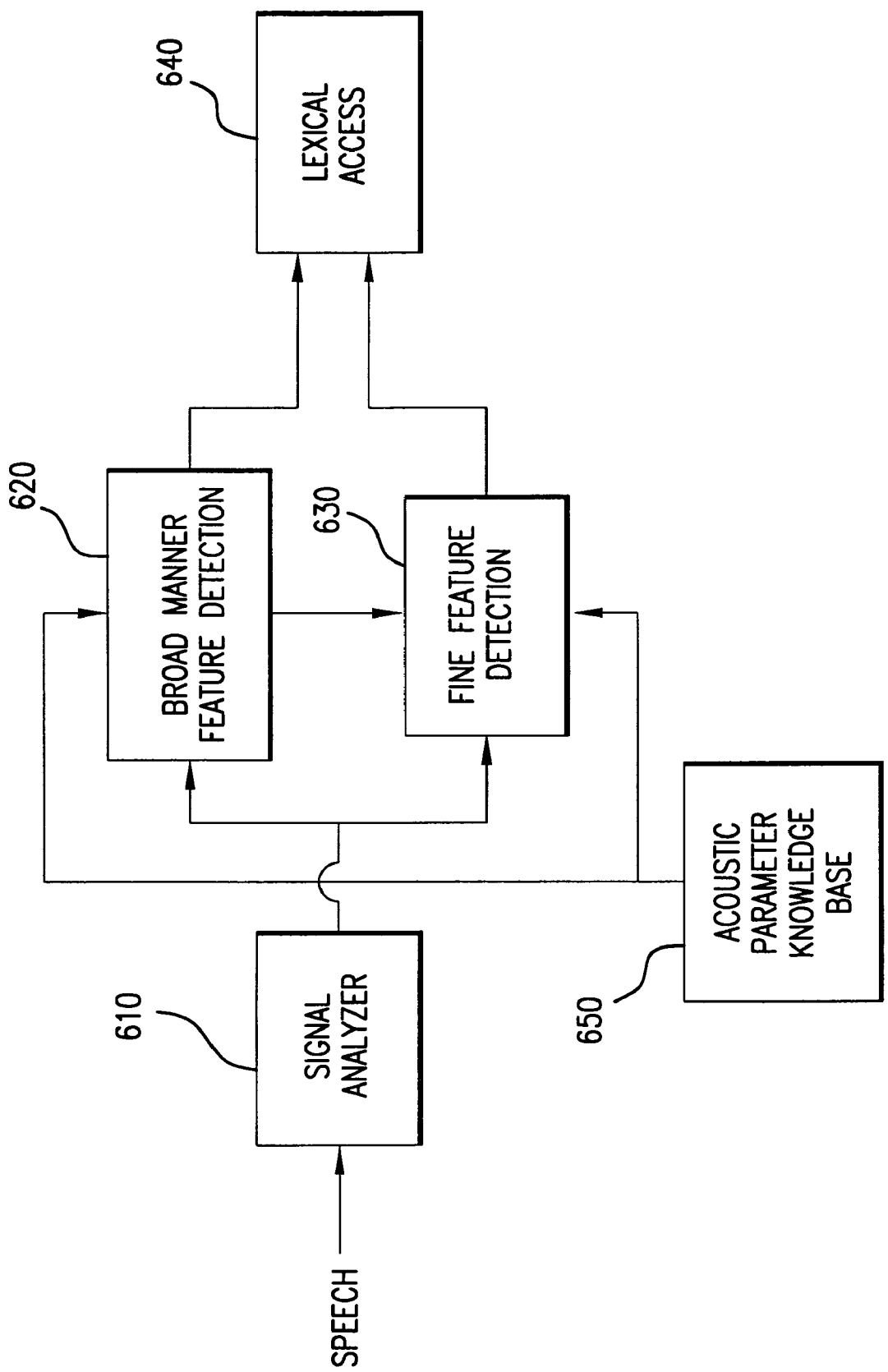
FIG. 6 is a block diagram of an exemplary system configuration of the present invention.

Having now identified some of the underlying concepts of the present invention, attention is now directed to an exemplary system configuration, which is illustrated by way of the block diagram of FIG. 6. It should be noted that the system illustrated is for purposes of describing certain features of the present invention and is not intended to limit the scope of the invention in any way. The invention may consist of hardware or software components or a combination of hardware and software. Furthermore, whereas a particular configuration and distribution of functionality among components is illustrated and discussed, other configurations and distributions of functionality are possible and within the intended scope of the invention, which is defined only by the appended Claims and not the description of exemplary embodiments.

Speech is introduced to signal analyzer 610, which transforms the speech into a time-indexed frequency signal representation thereof. Signal analyzer 610 extracts from the representative signal acoustic correlates corresponding to phonetic features of the original speech. For purposes of description and not limitation, known knowledge-based acoustic parameters will be used as the acoustic correlates. There are numerous repositories of acoustic parameters, such as the well-known TIMIT corpus. Techniques for extracting the acoustic parameters are also well known. As previously stated, however, the present invention is scalable to incorporate other acoustic correlates and extraction techniques as they are identified and developed.

The extracted acoustic parameters are conveyed as observation vectors to both broad manner feature detection module 620 for detecting the manner of articulation of the speech and fine feature detection module 630 for detecting fine manner and voice and place features of the speech. The broad manner detection module 630 passes landmark data to the fine feature detection module 630. Broad manner detection module 620 computes the probability P(L|O), or equivalently, P(B|O) and fine feature detection module 630 computes the probability P(U|OL). Further details into the respective functions corresponding to each of these modules are provided in paragraphs that follow. However, it should be apparent from this simplified description as to how the prudent selection of a hierarchy combined with the definition of Equation (1) affords a separation of recognition tasks. The broad manner detection module 620 assigns a probability to a path to a broad manner class, P(B|O), and a set of landmarks corresponding to that class. The landmarks are passed to the fine feature detection module 630, which designates a location in the hierarchy at which to continue the phonetic analysis. The fine feature detection module then computes a probability measure, P(U|OL), corresponding to the paths in the hierarchy terminating on a phoneme. Each of broad manner detection module 620 and fine feature detection module 630 may then convey its respectively computed probabilities to a subsequent process, such as lexical access module 640. When a set of most probable phonetic feature bundles is provided to lexical access module 640, further language oriented constraints may be applied to select the most applicable phonetic feature bundle from the set.

Acoustic parameter knowledge base 650 is a repository of acoustic parameters and corresponding phonetic features, such as the aforementioned TIMIT knowledge base. Knowledge base 650 is used in certain embodiments of the present invention to train the probabilistic pattern recognizers of the broad manner detection module 620 and the fine feature detection module 630, as will be described further below.

Figure 7:
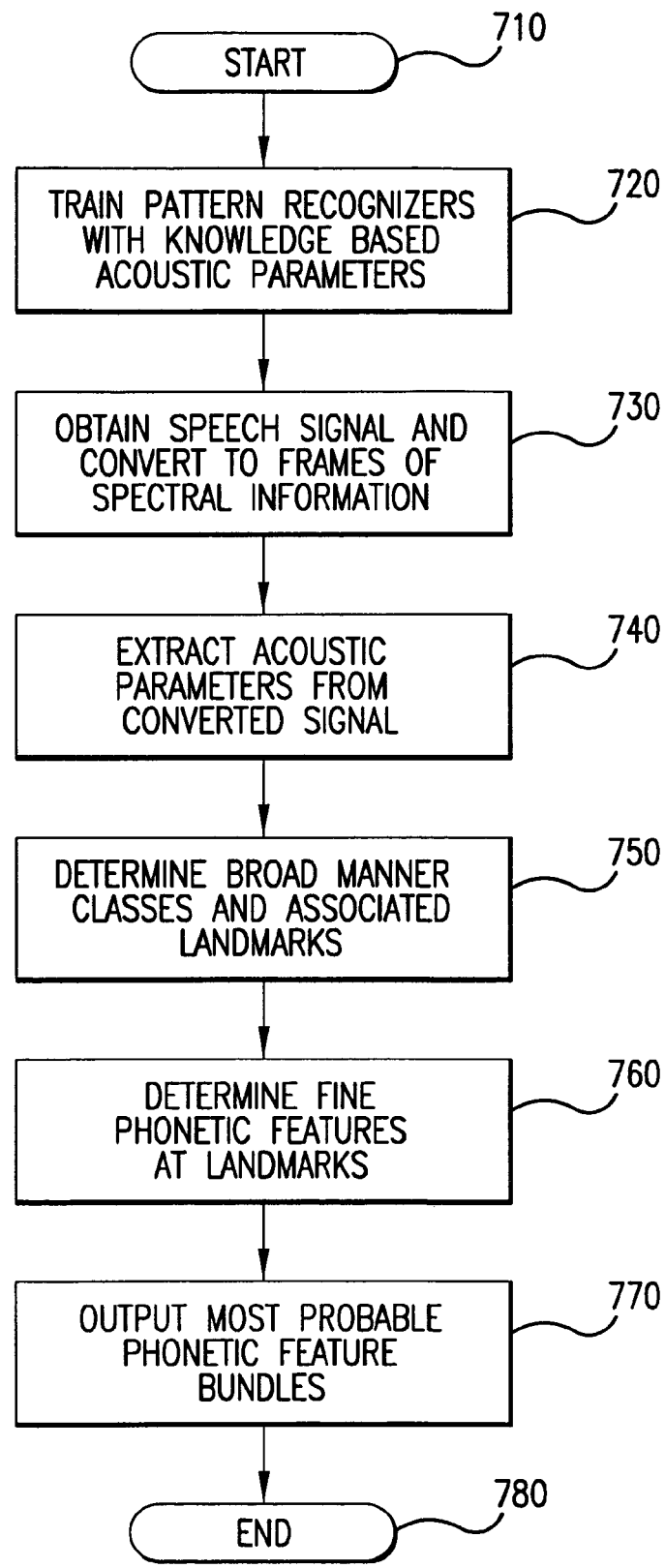
FIG. 7 is a flow diagram illustrating fundamental method steps of embodiments of the present invention.

A flow diagram of an exemplary automatic speech recognition method according to embodiments of the present invention is broadly illustrated in FIG. 7. The method initiates at start block 710 and flow is then transferred to block 720, whereby the probabilistic pattern recognizers are trained with the knowledge-based acoustic parameters. It should be noted that while the training is shown at the outset of the method, continual training of the pattern recognizers may occur during other times throughout the execution of the method. Such training is well known in the art and, so being, need not be discussed further here.

Once the pattern recognizers are sufficiently trained, process flow is transferred to block 730, where the speech signal is obtained and converted to a representation from which acoustic parameters corresponding to those of the knowledge base may be extracted. The acoustic parameters are then extracted from the converted signal, as shown at block 740.

Once the acoustic parameters have been extracted, some or all of the parameters are used to determine the broad manner classes of speech and the associated landmarks, as shown at block 750. The landmarks, in turn, are used to determine the phonetic features at block 760. The most probable phonetic feature bundles, and corresponding probability measures as defined above, are output by the method, as shown at block 770, which may be further processed by, for example, the lexical access module described in the discussion of FIG. 6. The method terminates at block 780.

Having now described certain fundamental aspects of the present invention, a more detailed description will now be provided. Mathematical foundations as well as exemplary implementations thereof will be described to enable a skilled artisan in the field of automatic speech recognition to carry out the invention.

Figure 8:
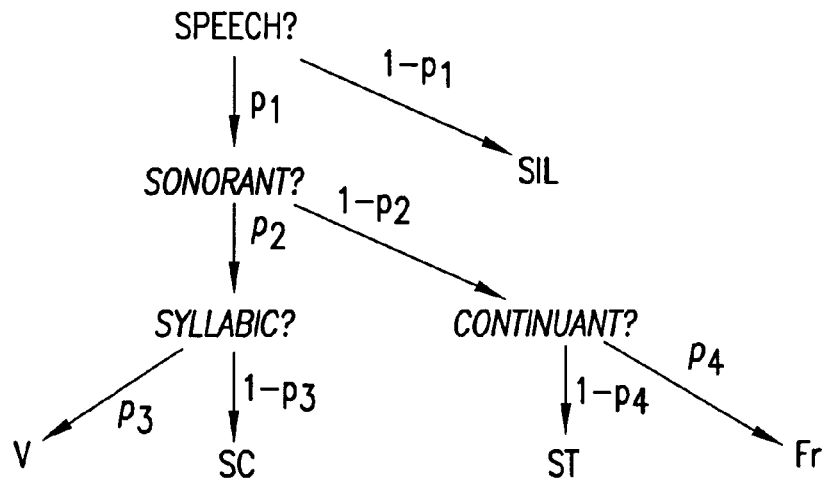
FIG. 8 is a binary tree diagram of broad manner classes in accordance with certain embodiments of the present invention.

Given a sequence of T frames, $O=\{o_1, o_2, \ldots, o_T\}$, where $o_t$ is a vector of acoustic correlates at time t, the most probable sequence of broad classes $B=\{B_i\}_{i=1}^{M}$ and the corresponding duration of each, $D=\{D_i\}_{i=1}^{M}$ must be determined. The observation vector $o_t$ is assumed to be, at a minimum, the set of all acoustic correlates for the frame corresponding to time t, although the present invention may not use all of the acoustic correlates for each frame or any redundant acoustic information in the frame in subsequent analysis. The EBS uses the probabilistic phonetic feature hierarchy shown in FIG. 8, which corresponds to the broad manner sub-hierarchy of FIG. 3, to segment speech into the exemplary five manner classes. The broad class segmentation problem, i.e., the determination of the broad manner classes and the corresponding durations, may be stated mathematically as, $$\hat{BD} = \underset{BD}{\mathrm{argmax}}\, P(BD|O) \quad (3)$$

If a frame at time t lies in the region of one of the manner classes, the a posteriori probability of the frame being part of a vowel at time t can be written as $$P_t(V|O) = P_t(\text{speech, sonorant, syllabic}|O) \quad (4)$$

$$= P_t(\text{speech}|O) P_t(\text{sonorant}|\text{speech},O) P_t(\text{syllabic}|\text{sonorant},O), \quad (5)$$

where $P_t$ denotes the a posteriori probability of a feature or a set of features at time t. Similar expressions may be written for any of the other manner classes.

Calculation of the a posteriori probability for each feature requires only the acoustic correlates of that feature. Furthermore, to calculate the posterior probability of a manner phonetic feature at time t, only the acoustic correlates of the feature in a set of frames $\{t-s, t-s+1, \ldots, t+e\}$, using s previous frames and e following frames along with the current frame t, are required to be used. Let this set of acoustic correlates extracted from the analysis frame and the adjoining frames for a feature f be denoted by $x_t^f$. Then, equation (5) may be rewritten as $$P_t(V|O) = P_t(\text{speech}|x_t^{speech}) P_t(\text{sonorant}|\text{speech}, x_t^{sonorant}) P_t(\text{syllabic}|\text{sonorant}, x_t^{syllabic}) \quad (6)$$

The probability $P(BD|O)$ may now be expanded in terms of the underlying manner phonetic features of each broad class. Denote the features for class $B_i$ as the set $\{f_1^i, f_2^i, \ldots f_{N_{B_i}}^i\}$, the broad class at time t as $b_t$, and the sequence $\{b_1, b_2, \ldots, b_{t-1}\}$ as $b^{t-1}$. Note that B is the broad class sequence with no duration information. On the other hand, $b_t$ denotes a broad class at time t and the sequence $b^t$, therefore, includes duration information by virtue of its inclusion of the broad class specifications of the frames up to time t. By assuming that the acoustic correlates of a manner feature at time t are sufficient even if $b^{t-1}$ is given (in Equation (6), it was assumed that the broad class specification of previous frames was not known), $$P(BD|O) = \prod_{i=1}^{M} \prod_{t=1+\sum_{j=1}^{i-1} D_j}^{D_i + \sum_{j=1}^{i-1} D_j} P_t(B_i|O, b^{t-1}) \quad (7)$$

$$= \prod_{i=1}^{M} \prod_{t=1+\sum_{j=1}^{i-1} D_j}^{D_i + \sum_{j=1}^{i-1} D_j} \prod_{k=1}^{N_{B_i}} P_t\left(f_k^i | x_t^{f_k^i}, f_1^i, \ldots, f_{k-1}^i, b^{t-1}\right) \quad (8)$$

In the above equation, $\sum_{j=1}^{i-1} D_j$ is the sum of the durations of the i−1 broad classes before the broad class i, and $\sum_{j=1}^{i} D_j$ is the sum of durations of the first i broad classes. Therefore, $\sum_{j=1}^{i} D_j - \sum_{j=1}^{i-1} D_j$ is the duration of the $i^{th}$ broad class and hence the numbers $\{1+\sum_{j=1}^{i-1} D_j, \ldots, D_i+\sum_{j=1}^{i-1} D_j\}$ are the frame numbers of the frames that are occupied by the $i^{th}$ broad class. Now expanding the conditional probability, $$P(BD|O) = \prod_{i=1}^{M} \prod_{t=1+\sum_{j=1}^{i-1} D_j}^{D_j + \sum_{j=1}^{i-1} D_j} \prod_{k=1}^{N_{B_i}} \frac{P_t\left(f_k^i, x_t^{f_k^i}, f_1^i, \ldots, f_{k-1}^i, b^{t-1}\right)}{P_t\left(x_t^{f_k^i}, f_1^i, \ldots, f_{k-1}^i, b^{t-1}\right)} \quad (9)$$

Splitting the priors, $$P(BD|O) = \prod_{i=1}^{M} \prod_{t=1+\sum_{j=1}^{i-1} D_j}^{D_j + \sum_{j=1}^{i-1} D_j} \prod_{k=1}^{N_{B_i}} P_t(f_k^i | f_1^i, \ldots, f_{k-1}^i, b^{t-1}) \quad (10)$$

$$\frac{P_t\left(x_t^{f_k^i} | f_1^i, \ldots, f_k^i, b^{t-1}\right)}{P_t\left(x_t^{f_k^i} | f_1^i, \ldots, f_{k-1}^i, b^{t-1}\right)}$$

Clearly, $$\prod_{i=1}^{M} \prod_{t=1+\sum_{j=1}^{i-1} D_j}^{D_i + \sum_{j=1}^{i-1} D_j} \prod_{k=1}^{N_{B_i}} P_t(f_k^i | f_1^i, \ldots, f_{k-1}^i, b^{t-1}) = P(BD) = P(B)P(D|B) \quad (11)$$

Now, given the set $\{f_k^i, \ldots, f_{k-1}^i\}$ or the set $\{f_1^i, \ldots, f_k^i\}$, $x_t^{f_k^i}$ is assumed to be independent of $b^{t-1}$, meaning that the acoustic correlates for a phonetic feature are assumed to be invariant with the variation of the broad class of neighboring frames. For example, the acoustic correlates for the feature sonorant are assumed to be invariant of whether the sonorant frame lies after the vowel, nasal or fricative frame. Holding this assumption as valid, $$P_t(BD|O) = \quad (12)$$

$$P(B)P(D|B) \prod_{i=1}^{M} \prod_{t=1+\sum_{j=1}^{i-1} D_j}^{D_j + \sum_{j=1}^{i-1} D_j} \prod_{k=1}^{N_{B_i}} \frac{P_t\left(f_k^i | x_t^{f_k^i}, f_1^i, \ldots, f_{k-1}^i\right)}{P_t(f_k^i | f_1^i, \ldots, f_{k-1}^i)}$$

In certain embodiments of the present invention, the a posteriori probabilities $P_t(f_k^i | x_t^{f_k^i}, f_1^i, \ldots f_{k-1}^i)$ are directly obtained by converting the output of SVM based classifiers, which is a distance from a class-separating hyperplane, as described below, to a probability measure using a histogram technique, such as binning. The discriminant space of the SVMs is split into bins and the a posteriori probability of a particular class is estimated as the ratio of the number of samples of that class in the bin to the total number of samples in that bin.

The probabilistic framework as applied to acoustic-phonetic ASR is among the novel features of the present invention. In implementing the framework, the assumption of invariance of acoustic correlates for a phonetic feature is relied upon. This invariance was demonstrated for the manner phonetic features in the development of Equation (12) and is further demonstrated for fine phonetic features in the development of Equation (30) below. The validity of this assumption is difficult to prove through rigorous mathematical methods. Generally, invariance must be separately evaluated for each acoustic correlate used in the probabilistic framework through empirical methods, such as through classification and scatter plot experiments. Comparative analysis has shown that, in many cases, APs are more invariant than MFCCs and APs for some place and voicing features more independent of the manner context than are MFCCs. This is not always true, however, and there are certainly cases where neither APs nor MFCCs satisfy the invariance assumption. Nevertheless, by prudent selection of acoustic correlates, the probabilistic framework of the present invention produces recognition results at a level comparable to prior art systems and methods. Moreover, the framework of the present invention is scalable, which allows utilization of new acoustic correlates as they become available. Thus, when an acoustic correlate for a feature is discovered that exhibits greater invariance than an acoustic correlate being used to identify the feature, the more invariant correlate may be easily substituted. Additionally, the framework of the present invention more readily allows analysis of recognition errors, such as when invariance of an acoustic correlate does not hold, so that shortcomings in a set of acoustic correlates for determining a phonetic feature may be identified, and then modified easily by virtue of the invention's scalability.

The calculation of P(BD|O) for a particular B and all D is computationally intensive in terms of storage and computation time. Therefore, an approximation is made that is similar to prior art approximation methods by Viterbi decoding, i.e., $$P_t(B|O) \approx \max_D P(BD|O) \qquad (13)$$

Because the probabilities P(B|O) calculated this way for different B will not add to unity, a more applicable approximation is $$P(B|O) \approx \frac{\max_D P(BD|O)}{\sum_B \max_D P(BD|O)} \qquad (14)$$

although the term in the denominator is not relevant to the maximization in equation (1).

Figure 9A:
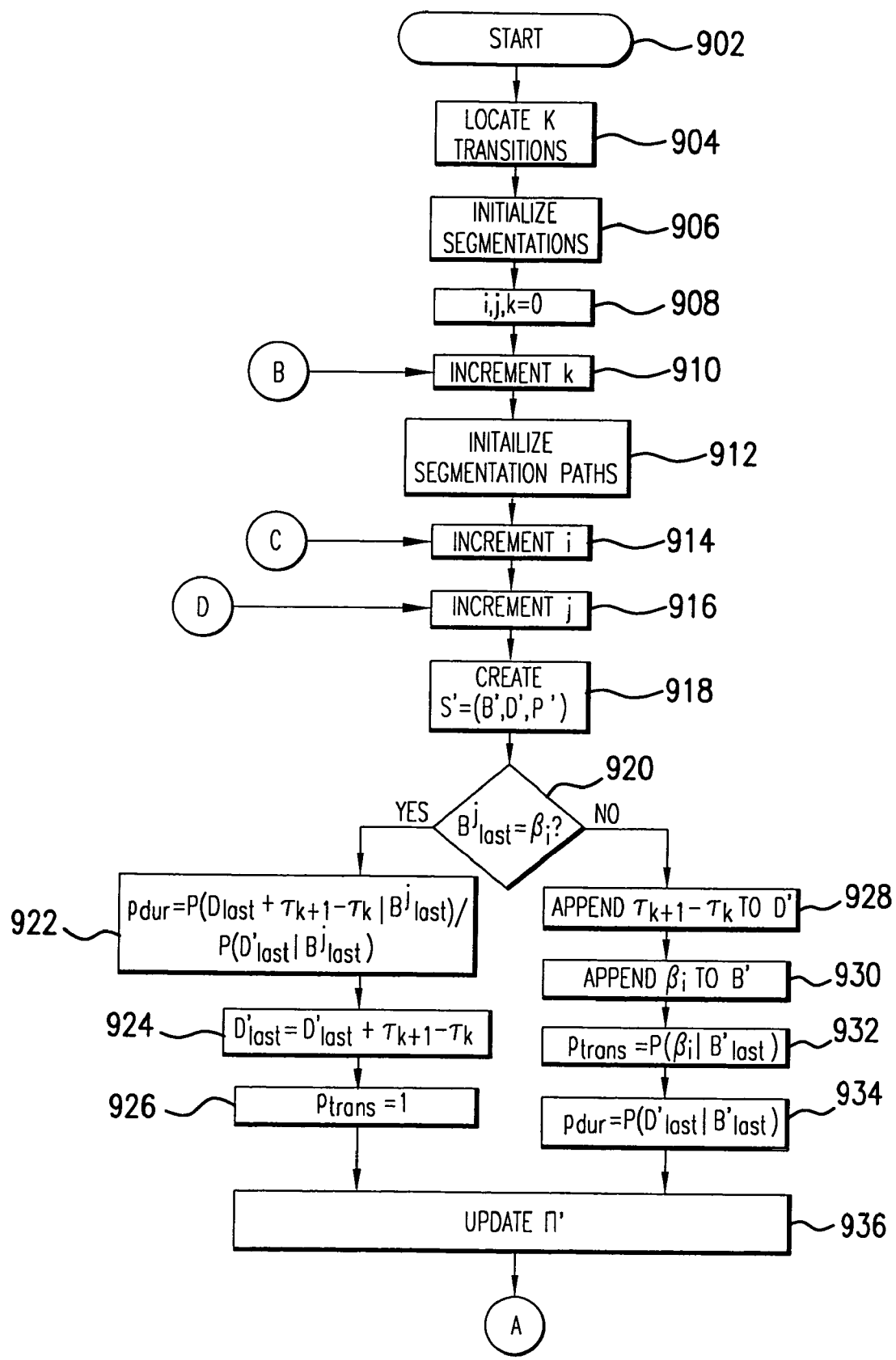
FIGS. 9A-9B is a flow diagram of an exemplary segmentation algorithm of certain embodiments of the present invention.
Figure 9B:
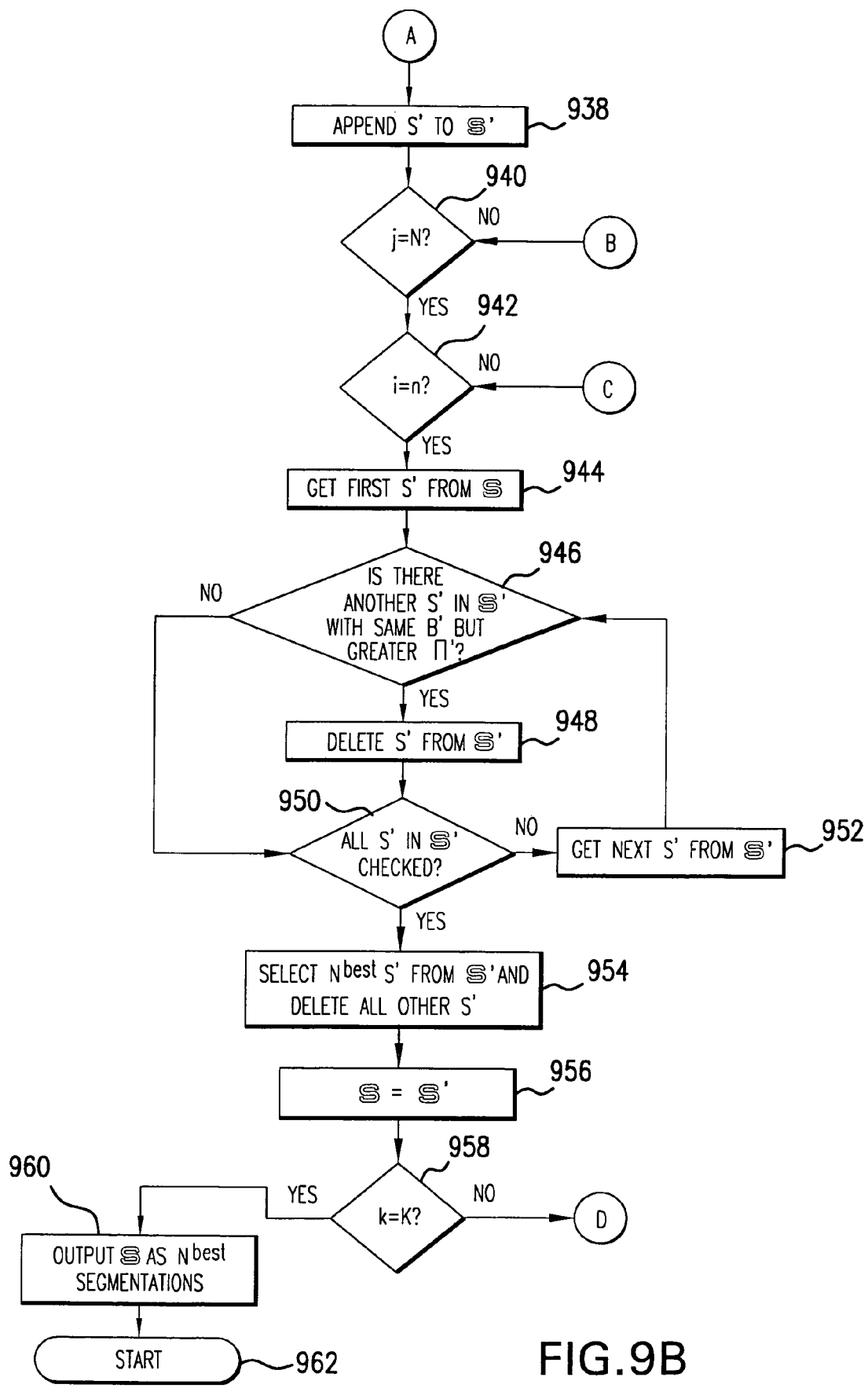

An exemplary probabilistic segmentation algorithm is illustrated in FIGS. 9A-9B. The procedure operates only on binary posterior probabilities of phonetic features in each frame as opposed to calculating a 'segment score' indicative of a likelihood of observations in a segment, as is implemented in prior art systems. Note that the algorithm of FIGS. 9A-9B computes the probability P(B|O) by determining the most likely sequence of durations and the corresponding probabilities, as described below.

For purposes of explanation of the exemplary segmentation procedure, denote the number of unique broad classes (five in the exemplary embodiment) by the symbol n and denote each by the symbol $\beta_i$, with i varying from 1 to n. A segmentation path will be denoted by a tuple (B, D, Π) with the sequence of broad classes B, a sequence of durations D and the a posteriori probability Π that the sequence of classes B and the corresponding sequence of durations D is representative of the speech corresponding to the segmentation. Let $N^{best}$ denote the number of most probable paths desired from the algorithm. It is assumed that a bigram language model for the priors P(B) is available, however the algorithm can be modified to consider other pronunciation models. Denote, further, the last element in the sequence D by $D_{last}$ and the last element in B by $B_{last}$.

Referring now to FIG. 9A, the exemplary segmentation procedure is initiated at block 902 whereupon flow is transferred to block 904 to begin the initialization of certain variables. At block 904, a sequence of transition times $\Gamma = \{\tau_i\}_{i=1}^K$ is formed, where K is the number of locations in time at which transitions occur. A change of broad class along a segmentation path will be allowed to occur only at the transition time locations, although it is not necessary that a class change occur at every transition time location.

Once the transition times sequence has been initialized, flow is transferred to block 906, where the segmentations are initialized. Initialization begins by forming a sequence of segmentations $S = \{S_i\}_{i=1}^N$, where $S_i$ is the segmentation $(B^i, D^i, \Pi^i)$, where $B^i = \{\beta_i\}$ and $D^i = \{\tau_1 - 1\}$. That is to say that for each broad class, a path is defined with that single broad class in the class sequence and a duration given by the length of time before the first transition point. The segment probabilities $\Pi^i$ may then be set as, $$\prod^i = \prod_{t=1}^{\tau_1-1} P_t(\beta_i|O) P(\tau_i - 1|\beta_i) P(\beta_i), \qquad (15)$$

where $P_t(\beta_i|O)$ may be computed by a histogram technique as explained with regard to Equation (12).

When the segmentations have been initialized, flow is transferred to block 908, where loop variables are initialized. Flow is then transferred to block 910, whereby the outermost loop variable, k, is set to unity and will count iterations corresponding to the K transition times. Flow is transferred, then, to block 912 whereby an empty set of segmentation paths S' is formed and initialized.

At block 914, the loop variable, i, is set to unity and will count the iterations corresponding to the n broad classes. At block 916, the loop variable, j, is incremented to unity and will count the number of iterations corresponding to the N segmentations in S. Flow is then transferred to block 918, whereupon the innermost loop is executed.

At block 918 of FIG. 9A, the segmentation $S_j = (B^j, D^j, \Pi^j)$ in S that was previously initialized is used to create a new path $S' = (B', D', \Pi') = (B^j, D^j, \Pi^j)$. Flow is then transferred to decision block 920, whereby it is determined if $B_{last}^j$ is the same as $\beta_i$. If so, flow is transferred to blocks 922, 924 and 926, whereby, respectively, the probability that the duration of the segment is representative of a completed segmentation, $p_{dur}$, is computed, the duration time of the last duration, $D'_{last}$, is updated, and the probability that a transition has occurred, $p_{trans}$, is set to unity. If, however, $B_{last}^j$ is not the same as $\beta_i$, as determined at decision block 920, flow is transferred to blocks 928-936, whereby, respectively, duration D' is appended to include $\tau_{k+1} - \tau_k$, class sequence B' is appended with $\beta_i$, the transition probability, $p_{trans}$, is set to the a posteriori probability $P(\beta_i|B'_{last})$, and the duration probability, $p_{dur}$, is set to the a posteriori probability $P(D'_{last}|B'_{last})$.

As shown in FIG. 9A, once the segmentation has been adjusted, flow is transferred to block 936, whereby the segmentation probability, Π', is updated according to, $$\prod{}' = \prod{}^j \prod_{t=\tau_k}^{\tau_{k+1}-1} P_t(\beta_i|O) p_{dur} p_{trans}, \qquad (16)$$

where, once again, a binning technique may be used to evaluate $P_r(\beta_r|O)$. Flow is then transferred to block 938 of FIG. 9B, whereby the segment S' is appended to S'.

At block 940 of FIG. 9B, the loop variable, j, is tested to determine if all of the N segmentations of S have been processed. If it has been determined that more segmentations of S require processing, flow is transferred back to block 916 of FIG. 9A, whereby j is incremented and the next S' is selected for processing. If it has been determined at block 940 that all N segmentations have been evaluated, flow is transferred to block 942, whereby the loop variable, i, is tested to determine if the segmentations have been evaluated for the presence of all of the n broad manner classes. If not all broad classes have been sought, flow is returned to block 914, whereby i is incremented and the next broad class is selected. If it has been determined at block 942 that all broad manner classes have been accounted for, flow is transferred to block 944.

At block 944 of FIG. 9B, the first S' in S' is selected in anticipation of determining the most probable segmentations. Flow is transferred, then, to decision block 946, whereby it is determined if another segment S' in S' has the same broad class sequence B' but with a higher probability measure, Π'. If so, S' is deleted from S' at block 948 and the next S' is checked via blocks 950, 952 and 946. If the condition of decision block 946 is not met, S' is retained in S' and the next S' is selected via block 950, 952 and 946.

When S' has been sorted, the $N^{best}$ segmentations of S' are selected and all other S' in S' are deleted, as shown at block 954. The set of segmentations S is then set to the sorted and condensed S' at block 956. Flow is then transferred to decision block 958, whereby the loop variable, k, is tested to evaluate if all K transition times have been processed. If not, flow is transferred back to block 910 of FIG. 9A, whereby k is incremented and segmentation for the next transition time is initiated. If segmentation for all transition times has been completed, as determined at block 958, flow is transferred to block 960, whereby the $N^{best}$ segmentations are output in S. The procedure is terminated at block 962.

Certain embodiments of the present invention make use of Support Vector Machines (SVMs) in pattern recognition processes. As was previously stated, certain embodiments of the invention implement pattern recognizers that can be trained by knowledge-based APs. When so trained, SVMs act as binary classifiers of phonetic features for both obtaining the broad manner classes and, thereby, the acoustic landmarks, and for detecting the place of articulation.

SVMs are, as is well known in the art, maximum margin classifiers. For linearly separable data lying in space $\Re^n$, the goal of SVM training for a two class pattern recognition system is to find a hyperplane defined by a weight vector w and a scalar b;

$$w.x+b=0, x\in\Re^n \tag{17}$$

such that the margin $2/\|w\|$ between the closest training samples with opposite classification labels is maximized.

As is generally known, SVMs select a set of $N_{SV}$ support vectors $\{x_i^{SV}\}_{i=1}^{N_{SV}}$ that is a subset of l vectors in the training set $\{x_i\}_{i=1}^{l}$ with class labels $\{y_i\}_{i=1}^{l}$. Through training, SVMs find an optimal separating hyperplane $f(x)$ (in the sense of maximization of margin) in a high dimensional space H, $$f(x) = \sum_{i=1}^{N_{SV}} y_i \alpha_i K(x_i^{SV}, x) - b. \tag{18}$$

The weights $\alpha_i$, the set of support vectors $\{x_i^{SV}\}_{i=1}^{N_{SV}}$ and the bias term b are determined from the training data using quadratic optimization methods.

The mapping $\Phi: \Re \mapsto H$ can be explicitly defined for certain kernels but it is usually difficult. The space H may be infinite dimensional, but because K is a scalar, this difficulty is not overwhelming. Moreover, the training of SVMs is straightforward, because of the linearity of the separating function $f(x)$ in K in Equation 18. Two commonly used kernels are radial basis function (RBF) kernel and linear kernel. For RBF kernel, $$K(x_i,x)=\exp(-\gamma|x_i-x|^2) \tag{19}$$

where the parameter $\gamma$ is usually chosen empirically by cross-validation from the training data. For the linear kernel, $$K(x_i,x)=x_i.x+1 \tag{20}$$

In certain embodiments, the SVMs are optimized for Structural Risk Minimization (SRM). Given a set of training vectors $\{x_i\}_{i=1}^{l}$, and the corresponding class labels $\{y_i\}_{i=1}^{l}$ such that $$y_i\in\{-1,+1\} \text{ and } x_i\in\Re^n, \tag{21}$$

assuming that the samples $\{x_i\}_{i=1}^{l}$ and the class labels $\{y_i\}_{i=1}^{l}$ are produced by a joint probability distribution $P(x,y)$ (note that $dP(x,y)=p(x,y)dxdy$ where $p(x,y)$ is the probability density). For a possible function $f(x,\alpha)$ that attempts to find the class labels for given vector x, the expected risk of the function or the expected error on unseen data is defined as $$R(\alpha) = \int \frac{1}{2}|y - f(x,\alpha)|dP(x,y). \tag{22}$$

With a probability $\eta(0\leq n\leq 1)$, the following bound on the expected risk exists $$R(\alpha) \leq R_{emp}(\alpha) + \sqrt{\frac{h(\log(2l/h) + 1 - \log(\eta/4))}{l}} \tag{23}$$

where h is referred to as the Vapnik Chemonenkis (VC) dimension and the second term on the right side is referred to as the VC confidence. $R_{emp}(\alpha)$ is the empirical risk given by, $$R_{emp}(\alpha) = \frac{1}{2l}\sum_{i=1}^{l}|y_i - f(x_i,\alpha)|. \tag{24}$$

The VC dimension h depends on the class of functions $f(x,\alpha)$ and the empirical risk is defined for a particular $\alpha$ under consideration. VC dimension h is defined as the maximum number of samples that can be separated by a function from the class of functions $f(x,\alpha)$ with any arbitrary labeling of those samples. The principle of structural risk minimization consists of finding the class of functions and a particular function belonging to that class (defined by a particular value of $\alpha$), such that the sum of the VC confidence and the empirical risk is minimized. SVM training finds a separating hyperplane by maximizing the margin across the two classes and this process of finding a maximum margin classifier has been linked to the SRM principle.

Figure 10:
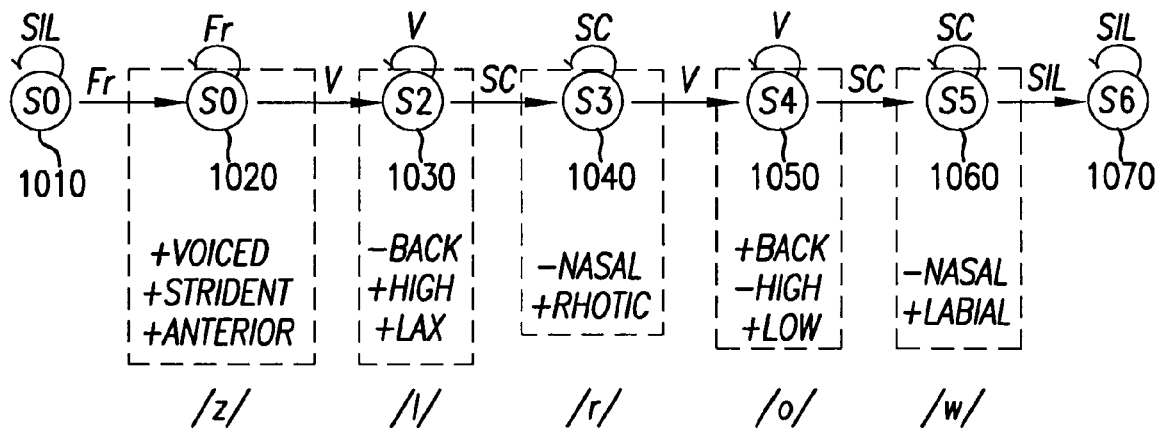
FIG. 10 is a state diagram illustrating the use of finite state automata in landmark constrained word detection in accordance with certain embodiments of the present invention.

Manner class segmentation paths may be constrained by a pronunciation model to facilitate isolated-word and connected word recognition. In certain embodiments of the present invention, the pronunciation model is constructed using Finite State Automata (FSA). The probabilities of phonetic features identified through the pronunciation model may be estimated from the landmarks obtained from the segmentation process. FIG. 10 illustrates an FSA pronunciation model for the word 'zero' with the canonical pronunciation /z I r ow/. The broad manner class representation is Fr-V-SC-V-SC, as shown at the automata 1020-1060, where it is assumed that the offglide of the final vowel /ow/ is recognized as a sonorant consonant. One transition is made for each frame of speech, starting at the initial state S0, shown at 1010, and ending with final state S6, shown at 1070. The transition probability at each state is equal to the a posteriori probability of the occurrence of the manner class that labels the transition. From the initial state S0, the best path through the FSA for the word 'zero' can be determined from (1) the a posteriori probability of a manner class to each frame as a transition probability, and (2) the a posteriori probability of the features listed below each state 1020-1060 once the search algorithm has exited that state and the next state (when sufficient information, i.e., current and adjoining landmarks, are available to obtain the acoustic parameters for those features.

FIG. 10 illustrates a simple case where only one set of features is associated with each broad class. Often, however, two sonorant consonants may occur consecutively so that two sets of features are associated with the broad class SC. In such a case, the first set of features (for example, the features +labial and +nasal for the sonorant consonant /m/ in "omni") are determined from the landmark associated with the onset of SC and the second set of features associated with /n/ are determined using consonant release (nasal-vowel boundary). For connected word recognition, the FSAs of all the words may be connected through a SILENCE state and the best path may be found using FSA. The probabilistic segmentation algorithm described above is modified such that only those transitions allowed by the automata are made at each transition point.

Using the acoustic landmarks obtained in the broad class recognition system, the probabilities of other manner phonetic features, and place and voicing features can be obtained. For example, given a manner class segmentation B={V,SC,V}, or more explicitly, the correspondence sequence of landmarks L={$l_1, l_2, l_3$}, and the observation vector O, to find the probability that the intervocalic SC is a nasal, the following acoustic observations are required: (1) the energy offset at the SC onset, (2) the density of formants (resonances) at the SC syllabic dip, (3) an energy ratio at the SC syllabic dip, (4) the energy onset at the SC offset (vowel onset) and (5) the stability of the spectrum in the SC region. Let the set of APs extracted from the set of landmarks $l_2$ for a feature f be denoted by $x_{l_2}^f$ and the probability that the SC in the sequence V-SC-V is the phoneme /n/ be denoted by $P_2(/n/)$ (the index 2 is used to denote that SC is the second broad class in the segmentation V-SC-V) and can be written, $$P_2(/n/|O,L) = P(\text{nasal}|l_2, x_{l_2}^{nasal}) P(\text{alveolar}|\text{nasal}, l_2, x_{l_2}^{alveolar}) \quad (25)$$

The assumption has been made that the SC landmarks and the acoustic correlates of the nasal and alveolar are sufficient to find the a posteriori probability of those features. In general, only the landmarks from adjoining broad class segments may be needed. For example, to find the probability that the SC in a V-SC-V sequence is an /r/, the measurement of the third formant (F3) in the adjoining vowels may be needed. This is so because /r/ is characterized by a sharp decline in F3 relative to the adjoining vowel. Therefore, $$P_2(/r/|O,L) = P(-\text{nasal}|l_2, x_{l_2}^{nasal}) P(\text{rhotic}|-\text{nasal}, l_1, l_2, l_3, x_{l_1}, l_2, l_3^{alveolar}) \quad (26)$$

In general, if the bundle of features in the fine feature sub-hierarchy for a phoneme $u_i$ is represented by $\{f_{N_{B_i}+1}^i, f_{N_{B_i}+2}^i, \ldots, f_{N_i}^i\}$, then given a sequence of landmarks $L=\{l_i\}_{i=1}^M$ and the observation sequence O, the conditional probability of the sequence of phonemes can be written as $$P(U|OL) = \prod_{i=1}^{M} \prod_{k=N_{B_i}+1}^{N_i} P_i(f_k^i | f_{N_{B_i}+1}^i, \ldots, f_{k-1}^i, L, x_{l_{i-1},l_i,l_{i+1}}^{f_k^i}, u^{i-1}), \quad (27)$$

where the sufficiency of the acoustic correlates $x_{l_{i-1},l_i,l_{i+1}}^{f_k^i}$ has been assumed. This can be rewritten as $$P(U|OL) = \prod_{i=1}^{M} \prod_{k=N_{B_i}+1}^{N_i} P_i(f_k^i | f_{N_{i+1}}^i, \ldots, f_{k-1}^i, L, u^{i-1}) \quad (28)$$

$$\frac{P(x_{l_{i-1},l_i,l_{i+1}}^{f_k^i} | f_k^i, f_{N_{B_i}+1}^i, \ldots, f_{k-1}^i, L, u^{i-1})}{P(x_{l_{i-1},l_i,l_{i+1}}^{f_k^i} | f_{N_{B_i}+1}^i, \ldots, f_{k-1}^i, L, u^{i-1})}$$

It is straightforward to see that, $$\prod_{i=1}^{M} \prod_{k=N_{B_i}+1}^{N_i} P_i(f_k^i | f_{N_{B_i}+1}^i, \ldots, f_{k-1}^i, L, u^{i-1}) = P(U|L) \quad (29)$$

If the APs of the place features are assumed to be invariant of the place features of the place context, the term $u^{i-1}$ can be ignored. Furthermore, the acoustic correlates may depend on the manner of the current sound and the adjoining sounds, therefore, instead of keeping the complete landmark sequence, only the landmarks $l_{i-1}, l_i, l_{i+1}$ may be kept in the above equation. For example, the acoustic correlates of the feature alveolar at a stop release may be dependent only on the presence of the closure, the release and whether the following sound is a vowel or a fricative, and not dependent on the sound that is present before the stop closure. Making these assumptions, $$P(U|OL) = \quad (30)$$

$$P(U|L) \prod_{i=1}^{M} \prod_{k=N_{B_i}+1}^{N_i} \frac{P(f_k^i | x_{l_{i-1},l_i,l_{i+1}}^{f_k^i}, f_{N_{B_i}+1}^i, \ldots, f_{k-1}^i, l_{i-1}, l_i, l_{i+1})}{P(f_k^i | f_{N_{B_i}+1}^i, \ldots, f_{k-1}^i, l_{i-1}, l_i, l_{i+1})}.$$

Figure 11:
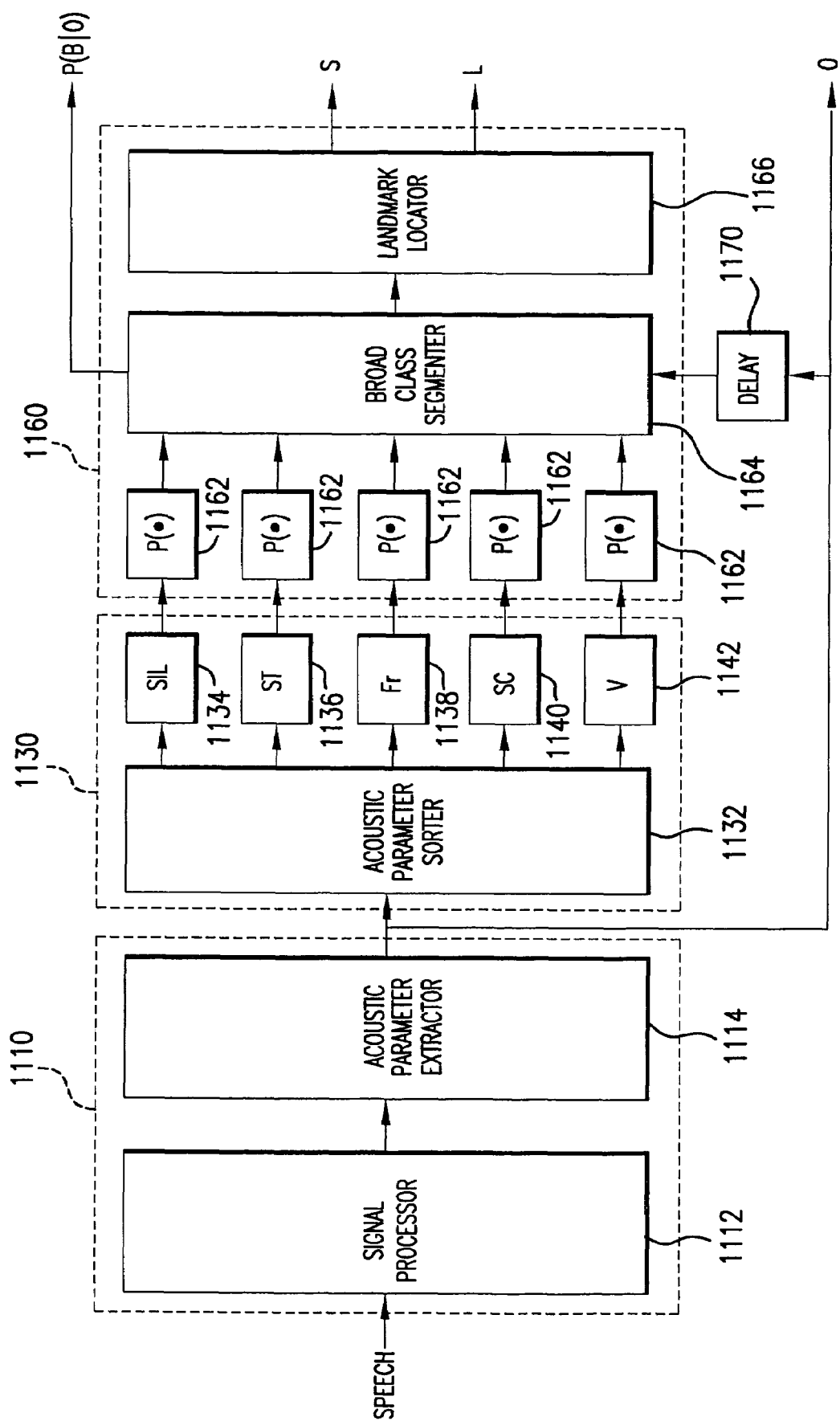
FIG. 11 is a block diagram illustrating details of a broad manner classifier in accordance with aspects of the present invention.

The implications of the principles of the present invention, as presented above, will now be demonstrated by way of an exemplary system configuration implementing certain ones of those principles. Referring now to FIG. 11, there is shown by way of a block diagram components that may implement the functionality of signal analyzer 610 and broad manner feature detector 620 of FIG. 6. Again, it should be clear that the system illustrated is for purposes of describing certain features of the present invention and is not intended to limit the scope of the invention in any way and, whereas a particular configuration and distribution of functionality among components is illustrated and discussed below, other configurations and distributions of functionality are possible and within the intended scope of the invention, which is defined only by the appended Claims and not the description of exemplary embodiments.

The system of FIG. 11 consists of a front end processor 1110 for conditioning the speech for further analysis, a pattern recognizer 1130 for classifying the conditioned signal into its corresponding broad manner classes and a landmark locator 1160 for determining the landmark locations and providing a probability measure of likelihood that the corresponding landmark sequence is representative of the speech.

Speech is presented to signal processor 1112 where it is first converted to an electrical representation thereof via a transducer, such as a microphone. The electrical representation is further processed by signal processor 1112 into a time-indexed frequency-domain representation thereof via, for example, a Discrete Fourier Transform (DFT) or some computationally expedient version thereof. An example of a time-indexed frequency domain representative signal is a spectrogram, such as that shown at 1320 of FIG. 13. The time-indexed frequency-domain representative signal, which shall hereinafter be referred to as the speech signal for brevity, is provided to acoustic parameter extractor 1114.

As previously stated, all acoustic parameters available are extracted from the speech signal. That is to say, all acoustic correlates associated with the knowledge base on which the phonetic feature hierarchy is based are extracted from the signal at the front end processor 1110. Extraction techniques in the art for various acoustic parameters are numerous and well known. As such, specific techniques will not be discussed further here. A complete set of extraction methods corresponding to all of the acoustic parameters associated with the phonetic feature hierarchy are implemented by acoustic parameter extractor 1114 and all acoustic parameters are extracted thereby. The output of the acoustic parameter extractor is the set O of observation vectors discussed above. The set O is passed to pattern recognizer 1130 as well as to the fine feature detector, as will be discussed further below.

The acoustic parameters associated with the broad manner classes are extracted from the set O of observation vectors by acoustic parameter sorter 1132. The applicable acoustic parameters are then passed to pattern recognizers 1134-1142 for determining the broad manner class from the broad manner sub-hierarchy. Note that while the pattern recognizers are shown as an autonomous component for each class, the implementation may be otherwise. While numerous pattern recognizers would be easily incorporated into the present invention, an exemplary implementation would include an SVM at each node of the class hierarchy shown in FIG. 8. That is, an SVM would occupy each of the phonetic features sonorant, syllabic and continuant, as well as the determination of speech. The determination of manner class would result from the binary classification of each successive SVM.

Depending on implementation of the pattern recognizer, the output thereof may need to be converted to a probability measure of the likelihood that the manner class is representative of the frame of speech. In the exemplary embodiment of SVMs classifying the broad manner features, the outputs thereof, being a distance from the class-separating hyperplane, must be converted into a probability measure, which, as stated above, may be accomplished by binning. The probability conversion is provided by a set of converters 1162 at the input of the landmark location subsystem 1160. The output of each converter 1162 is the afore-mentioned probability measure which is passed to the broad class segmenter 1164.

The broad class segmenter 1164 implements a segmentation algorithm, such as that described in conjunction with FIGS. 9A-9B. Note that a delay element 1170 may be introduced to synchronize the arrival of observations with the associated probability measure. In this manner, the broad class segmenter may provide manner data to the landmark locator 1116. As stated above, the broad class segmentation algorithm outputs the a posteriori probability P(B|O), which is a factor in Equation (1) for determining the most probable phonetic feature bundles.

Landmark locator 1166 receives broad manner sequence data, such as the set S described above, from the segmentation algorithm and determines therefrom an associated set of landmark locations. The landmark locator passes through the set S and the set of landmark locations L to the fine feature detection system, which is described next.

Figure 12:
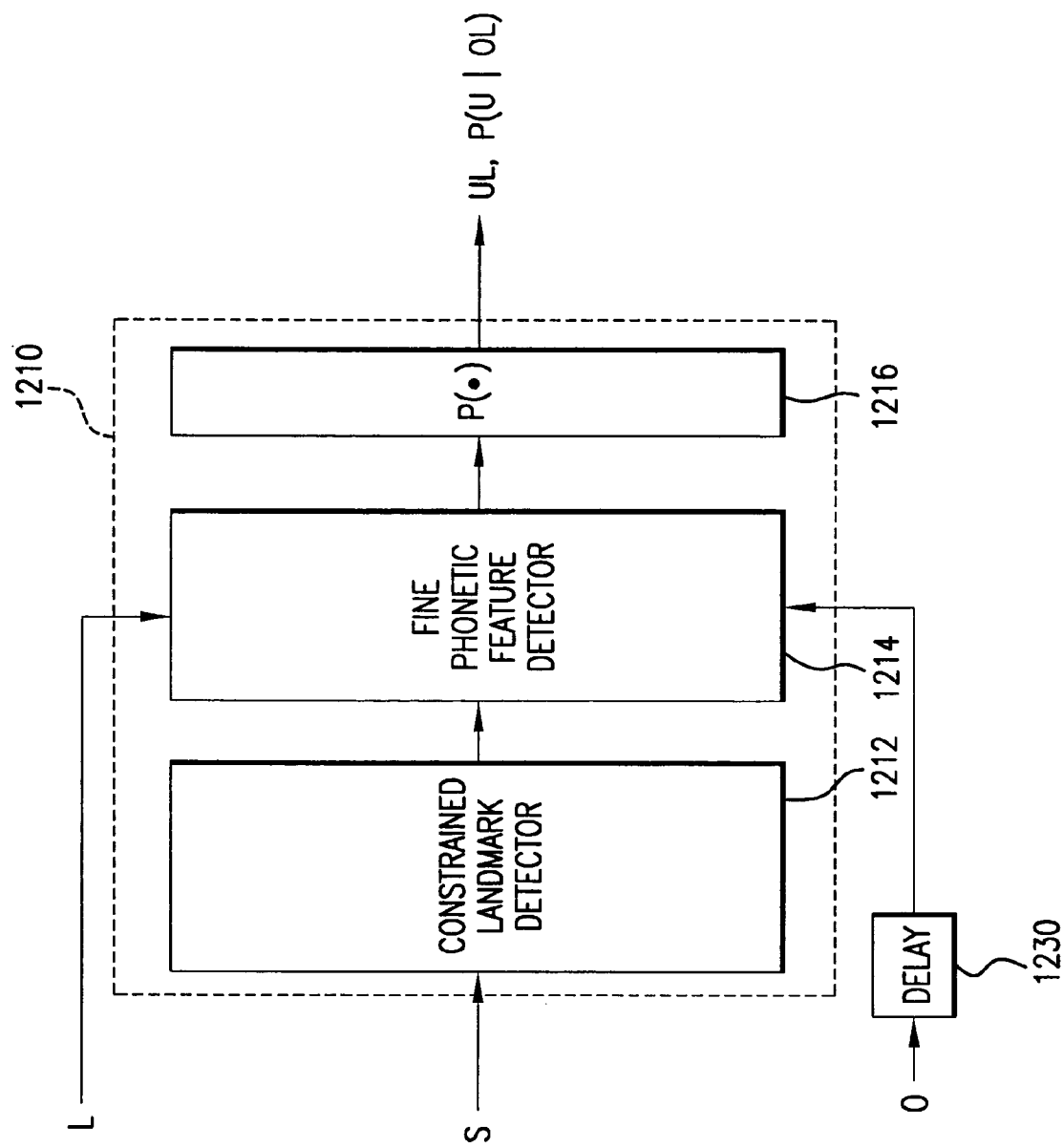
FIG. 12 is a block diagram illustrating details of a fine phonetic feature detector in accordance with certain embodiments of the present invention.

Referring now to FIG. 12, there is shown an exemplary embodiment of a fine feature detection module 1210, which may implement the fine feature detection module 630 of FIG. 6. The segmentation set S is introduced to the constrained landmark detector 1212, which may be implemented by a system of FSAs as described above. Detected words and word groups, as well as the segment set S, are passed to fine feature detector 1214. The set of landmark locations L from the broad manner class system are provided to the fine feature detector 1214 as well as the set of observation vectors O. Fine feature detector analyzes the data at the provided landmark locations to determine the phonetic features associated therewith. This may be accomplished by the use of SVMs at the branch points of the fine feature sub-hierarchy in similar manner to that described for the broad manner sub-hierarchy. Note that the set O may be synchronized with the landmark locations L by the use of a delay unit 1230.

The output of the fine feature detector 1214 may require conversion to a probability measure of likelihood that the associated phonetic feature is representative of the speech. Probability converter 1216, in certain embodiments would implement Equation (30) and may be accomplished by a histogram technique at the output of the SVMs. The output of the probability converter 1216 would provide the second factor of Equation (1), P(U|OL), which is used to determine the most likely phonetic feature bundles.

Figure 13:
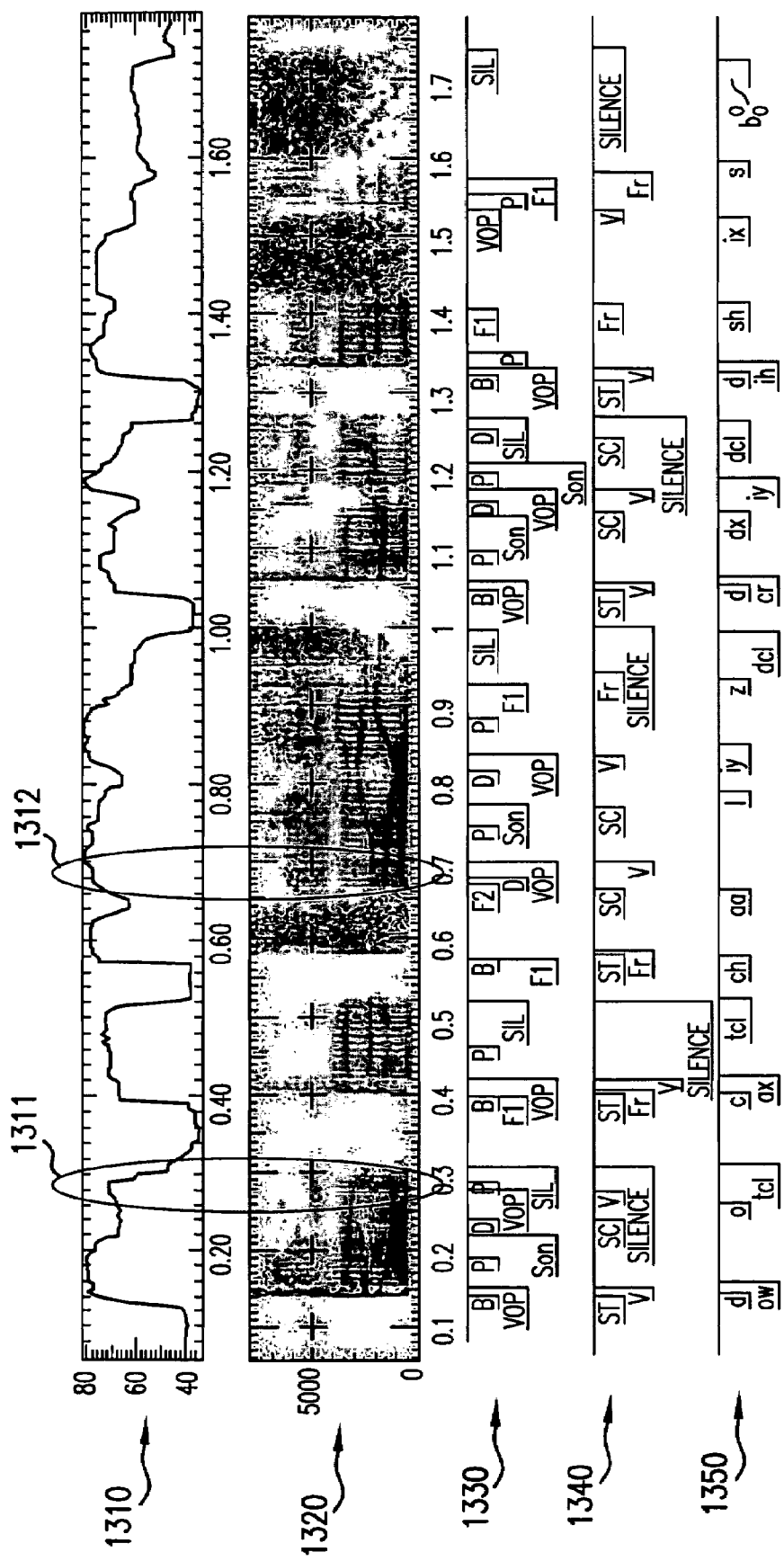
FIG. 13 is a chart illustrating errors in the determination of phonetic features of the utterance "Don't do Charlie's dirty dishes" as generated by certain embodiments of the present invention; and, FIG. 14 is a chart illustrating most probable landmark sequences of the utterance "two" as determined by certain embodiments of the present invention.

As previously stated, among the beneficial features of the present invention is that errors are more readily analyzed. Referring now to FIG. 13, there is shown landmarks generated by the present invention on a test sentence, "Don't do Charlie's dirty dishes", as obtained from the TIMIT corpus. A spectrogram of the sentence is shown at 1320. The pattern recognizers were trained using the TIMIT knowledge base. The acoustic parameter E[2000, 3000] is shown at 1310, and the landmark labels, the broad class labels and the hand-classified phoneme labels are at 1330, 1340 and 1350, respectively. Note that the broad class and phoneme labels are marked at the beginning of each sound, and the landmark label shows the time instant of each landmark. The ellipses indicate the locations of two errors made by EBS on the utterance. At ellipse 1311, E[2000, 3000] dips in the region associated with the feature nasal and then rises sharply indicating the presence of a vowel when no vowel is present. At ellipse 1312, E[2000, 3000] does not dip in the region of the vowel /aa/ (although it was determined that the vowel was /r/-colored from a low F3), but the pattern recognizer produces the landmark for a syllabic dip. In both cases, the errors can be traced to a deficiency in the set of acoustic correlates used to identify the particular phonetic feature. Such error locating capability is not available in systems of the prior art, especially those systems based on HMMs.

Figure 14:
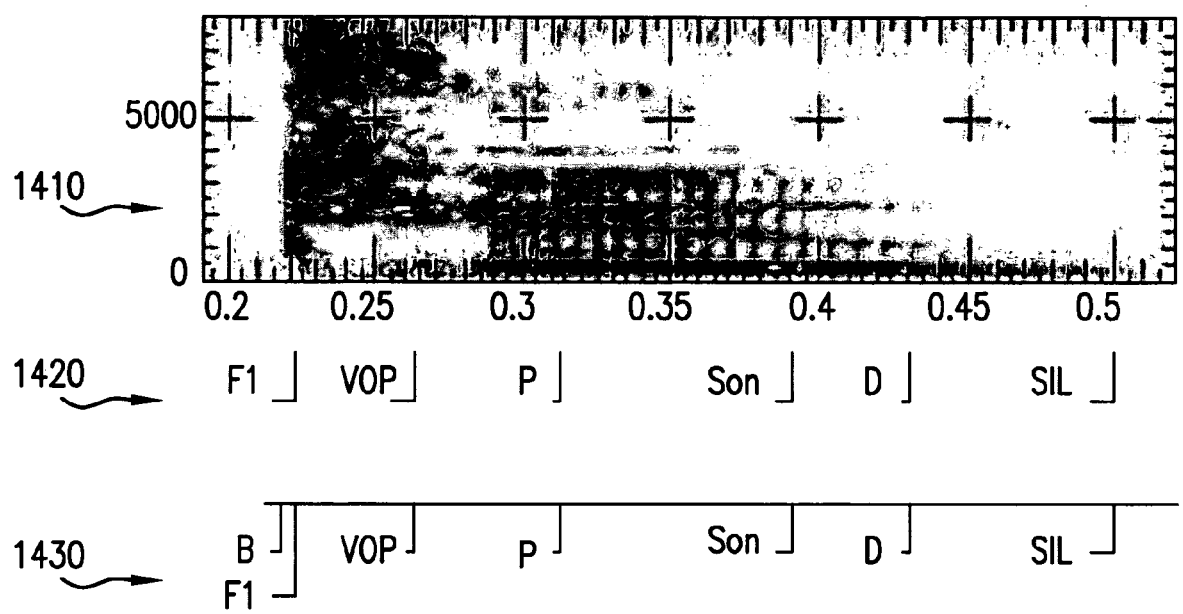

FIG. 14 illustrates an example of the output of the unconstrained probabilistic segmentation algorithm for the utterance "two" with canonical pronunciation /t uw/. The spectrogram of the utterance is shown at 1410 and the two most probable landmark sequences are shown at 1420 and 1430, respectively. Note that the first-most probable sequence at 1420 does not include a consonant at the beginning of the utterance. The missed consonant is correctly positioned in the second most probable sequence at 1430. The correct sequence may be determined by a lexical access module, but at a later date, as fine feature detectors are developed, it is expected that the fine feature detector would assign the higher probability measure to the sequence at 1430. This is illustrative, however, that the EBS may be used with confidence, even while further refinements are made at finer levels, as the output thereof may, in the meantime, be constrained by subsequent processing.

Although the invention has been described herein in conjunction with specific embodiments thereof, many alternatives, modifications and variations will be apparent to those skilled in the art. The description above is intended to illustrate the invention by way of the specific embodiments, and not to restrict the invention thereto. The scope of the invention, therefore, should be determined not with reference to the above description, but instead should be determined with reference to the appended Claims along with their full scope of equivalents.

What is claimed is:

1. A method for executing in a computing system automatic recognition of speech comprising:
    providing a pre-stored knowledge base, the knowledge base including phonetic features, each of said phonetic features associated with a corresponding set of acoustic correlates;
    organizing in a processor said phonetic features into a hierarchy, said hierarchy including a broad manner sub-hierarchy of broad manner phonetic features and a fine phonetic feature sub-hierarchy of fine phonetic features, each of said broad manner phonetic features corresponding to a set of acoustic landmarks;
    providing a pattern recognizer executable for determining a phonetic feature of said hierarchy from a set of acoustic correlates provided thereto and for determining for a phonetic feature of said hierarchy a probability measure of likelihood that said provided set of acoustic correlates is associated therewith;
    training said pattern recognizer on said phonetic features and said each corresponding set of acoustic correlates of said knowledge base;
    obtaining a speech signal, said speech signal including a sequence of speech frames;
    extracting acoustic correlates from each frame of said sequence of speech frames;
    classifying said acoustic correlates into set of broad manner classes via said pattern recognizer, said broad manner classes corresponding to said broad manner phonetic features;
    determining locations of acoustic landmarks from said set of broad manner classes;
    forming a plurality of possible landmark sequences from said acoustic landmarks;
    computing for each possible landmark sequence a first probability measure of likelihood that said possible landmark sequence is representative of the speech;
    determining from said acoustic correlates of a predetermined number of speech frames proximate to each of said acoustic landmarks a corresponding fine phonetic feature of said fine phonetic feature sub-hierarchy for each of said set of broad manner classes via to said pattern recognizer;
    forming a plurality of possible fine phonetic feature sequences from said fine phonetic feature corresponding to each of said set of broad manner classes;
    computing for each possible fine phonetic feature sequence a second probability measure of likelihood that said possible fine phonetic feature sequence is representative of the corresponding possible landmark sequence; and
    combining a landmark sequence from said plurality of possible landmark sequences with a fine phonetic feature sequence from said plurality of possible fine phonetic feature sequences in accordance with a product of said first probability measure corresponding to said landmark sequence and said second probability measure corresponding to said fine phonetic feature sequence being among a predetermined number of maximum values of said product for all of said possible landmark sequences and all of said possible fine phonetic feature sequences.

2. The method as recited in claim 1, where said acoustic landmarks location determining step includes the step of identifying an acoustic landmark by one of the group consisting of a temporally abrupt change in a frequency spectrum representation of the speech and a locally prominent feature of a smoothly varying acoustic characteristic of said frequency spectrum representation.

3. The method as recited in claim 1, where said fine phonetic feature determining step includes the step of determining said fine phonetic feature corresponding to each said broad manner class from among only fine phonetic features of said fine phonetic feature sub-hierarchy produced by a pronunciation model responsive to said speech frames proximate to said acoustic landmarks.

4. The method as recited in claim 3, where said fine phonetic feature determining step includes the step of constructing said pronunciation model from Finite State Automata.

5. The method recited in claim 1, where said hierarchy organizing step includes the step of organizing said hierarchy of said phonetic features as a binary tree.

6. The method as recited in claim 5, where said pattern recognizer providing step includes the step of providing a binary classifier at each decision branch in said binary tree to form a broad manner class pattern recognizer for classifying said broad manner phonetic features and a fine phonetic feature pattern recognizer for classifying said fine phonetic features.

7. The method as recited in claim 6, where said fine phonetic feature determining step includes the step of applying said acoustic correlates of said predetermined number of speech frames to said fine phonetic feature pattern recognizer.

8. The method as recited in claim 6, where said binary classifier providing step includes the step of providing a maximum margin classifier as said binary classifier.

9. The method as recited in claim 8, where said binary classifier providing step includes the step of providing a support vector machine as said maximum margin classifier.

10. The method as recited in claim 6, where said acoustic correlate classifying step includes the step of classifying said acoustic correlates via said broad manner class pattern recognizer.

11. The method as recited in claim 10, where said fine phonetic feature determining step includes the step of applying said acoustic correlates of said predetermined number of speech frames to said fine phonetic feature pattern recognizer.

12. The method as recited in claim 6, including the step of converting the output of said binary classifier to a classifier probability measure.

13. The method as recited in claim 12, where said first probability measure computing step includes the step of computing said first probability measure from said classifier probability measure from said binary classifier at each said decision branch of said broad manner class pattern recognizer.

14. The method as recited in claim 12, where said second probability measure computing step includes the step of computing said second probability measure from said classifier probability measure from said binary classifier at each said decision branch of said fine phonetic feature pattern recognizer.

15. A system for automatic speech recognition comprising:
- a knowledge base of phonetic features, each of said phonetic features associated with a corresponding set of acoustic correlates;
- a front end processor for converting speech into a speech signal, said speech signal including a sequence of speech frames;
- a broad manner pattern recognizer operative to determine a broad manner phonetic feature from a hierarchy of said phonetic features responsive to a set of acoustic correlates, said broad manner pattern recognizer coupled to said knowledge base so as to receive therefrom said phonetic features and said corresponding set of acoustic correlates as training data;
- a landmark locator operative to determine acoustic landmarks from broad manner classes identified by said pattern recognizer, each of said broad manner classes corresponding to said broad manner phonetic feature of said hierarchy, said landmark locator further operative to compute a first probability measure of likelihood that an acoustic landmark sequence is representative of said speech; and
- a fine feature detection module for determining a fine phonetic feature of said hierarchy from acoustic correlates of a predetermined number of said speech frames proximate to said acoustic landmarks, said fine feature detection module further operative to compute a second probability measure of likelihood that said fine phonetic feature is representative of a sequence of said acoustic landmarks, said fine feature detection module coupled to said knowledge base so as to receive therefrom said phonetic features and said corresponding set of acoustic correlates as training data, wherein a sequence of said fine phonetic features and a sequence of said acoustic landmarks are candidates of likely feature bundles corresponding to said speech if a product of said first probability measure corresponding to said sequence of acoustic landmarks and said second probability measure corresponding to said sequence of fine phonetic features are among a predetermined number of maximum values of said product.

16. The system as recited in claim 15, wherein said front end processor includes an acoustic parameter extractor for extracting acoustic correlates from each speech frame of said sequence of speech frames, said acoustic parameter extractor coupled to said broad manner pattern recognizer for providing said acoustic correlates thereto.

17. The system as recited in claim 16, wherein said broad manner pattern recognizer includes an acoustic parameter sorter operative to select from said acoustic correlates received from said acoustic parameter extractor said set of acoustic correlates.

18. The system as recited in claim 15, wherein said fine feature detection module includes a constrained landmark detector and a fine phonetic feature detector, said constrained landmark detector including a pronunciation model responsive to said acoustic correlates of said speech frames proximate to said acoustic landmarks and operative to constrain said determination of said fine phonetic feature to only fine phonetic features of said hierarchy produced thereby, said fine phonetic feature detector including a pattern recognizer operative to perform said determination of said fine phonetic feature from said acoustic correlates of said predetermined number of said speech frames proximate to said acoustic landmarks as constrained by said pronunciation model.

19. The system as recited in claim 18, wherein said pronunciation model includes finite state automata for constraining said determination of said fine phonetic feature.

20. The system as recited in claim 18, wherein said broad manner pattern recognizer and said pattern recognizer in said fine phonetic feature detector include space vector machines for determining a phonetic feature from said hierarchy.

* * * * *